US008787968B2

(12) United States Patent
Lee et al.

(10) Patent No.: US 8,787,968 B2
(45) Date of Patent: Jul. 22, 2014

(54) MOBILE TERMINAL AND IMAGE DISPLAY METHOD THEREIN

(75) Inventors: Choonsik Lee, Seoul (KR); Donghyun Lee, Incheon (KR)

(73) Assignee: LG Electronics Inc., Seoul (KR)

( * ) Notice: Subject to any disclaimer, the term of this patent is extended or adjusted under 35 U.S.C. 154(b) by 356 days.

(21) Appl. No.: 12/986,807

(22) Filed: Jan. 7, 2011

(65) Prior Publication Data
US 2011/0275409 A1 Nov. 10, 2011

(30) Foreign Application Priority Data
May 6, 2010 (KR) .......................... 10-2010-0042373

(51) Int. Cl.
H04M 1/00 (2006.01)
G06F 3/0481 (2013.01)
G06F 1/16 (2006.01)
G06F 3/01 (2006.01)

(52) U.S. Cl.
CPC ............ *G06F 3/0481* (2013.01); *G06F 1/1643* (2013.01); *G06F 1/1686* (2013.01); *G06F 3/011* (2013.01)
USPC ........ 455/556.1; 455/566; 455/407; 455/418; 455/424; 455/425; 455/457

(58) Field of Classification Search
USPC .............. 455/556.1, 566, 407, 418, 424, 425, 455/457; 382/100, 113, 224, 282
See application file for complete search history.

(56) References Cited

U.S. PATENT DOCUMENTS

| 2005/0212817 | A1* | 9/2005 | Cannon et al. | ................. 345/619 |
| 2009/0092277 | A1* | 4/2009 | Ofek et al. | ..................... 382/100 |
| 2010/0093365 | A1* | 4/2010 | Bloebaum | .................. 455/456.1 |

FOREIGN PATENT DOCUMENTS

| CN | 1941935 | 4/2007 |
| CN | 101345003 | 1/2009 |
| CN | 101619976 | 1/2010 |
| CN | 101673179 | 3/2010 |
| JP | 2000339328 | 12/2000 |
| JP | 2004046424 | 2/2004 |

* cited by examiner

*Primary Examiner* — Kwasi Karikari
(74) *Attorney, Agent, or Firm* — Lee, Hong, Degerman, Kang & Waimey

(57) ABSTRACT

A mobile terminal and image displaying method therein, by which a display of object relevant information included in a preview image can be effectively controlled. The present invention includes receiving an input of the image externally, obtaining object relevant information of each of a plurality of objects, displaying the inputted image in a manner of displaying the object relevant information of each of a plurality of the objects within the inputted image, receiving an input of a sort command signal for sorting the object relevant information externally, and sorting and displaying the object relevant information of each of a plurality of the objects according to the input of the sort command signal to correspond to at least one of a distance, a direction and a category of each of a plurality of the objects.

9 Claims, 38 Drawing Sheets

FIG. 6C

| Category\Distance (m) | Public office | Theater | Park | Apartment | School |
|---|---|---|---|---|---|
| 0~100 | City hall |  | **Lake |  |  |
| 100~200 | Fire station |  |  | ** Complex 1 |  |
| 200~300 |  |  |  | ** Complex 2-3 |  |
| 300~400 |  | XX Theater |  |  | ○○ Elementary school |
| 400~500 |  |  |  |  | ○○ Middle/High school |

Return — 601

FIG. 10B

| Category<br>Distance (m) | Public office | Theater | Park | Apartment | School |
|---|---|---|---|---|---|
| 0~100 | 02-777-7777<br>City hall<br>119 | | **Lake<br>02-321-3124 | 02-111-1111 | |
| 100~200 | Fire station | | | **Complex 1<br>02-111-1112 | |
| 200~300 | | 02-561-5618 | | **Complex 2-3 | 02-777-xxxx |
| 300~400 | | XX Theater | | | ○○ Elementary school<br>02-666-xxxx |
| 400~500 | | | | | ○○ Middle/High school |

Return — 601

FIG. 10C

| Category Distance (m) | Public office | Theater | Park | Apartment | School |
|---|---|---|---|---|---|
| 0~100 | 10th election | | Picnic under the cherry blossoms | | |
| 100~200 | Precautions against fire season | | | 1 article for urgent sale | |
| 200~300 | | | | 2 article for urgent sale | |
| 300~400 | | New movie preview | | | Flu prevention rules |
| 400~500 | | | | | Mid-term test period |

Return — 601

| Category / Distance (m) | Public office | School |
|---|---|---|
| 0~100 | City hall | |
| 100~200 | Fire station | |
| 200~300 | | |
| 300~400 | | ○○ Elementary school |
| 400~500 | | ○○ Middle/High school |

Return — 601

MOBILE TERMINAL AND IMAGE DISPLAY METHOD THEREIN

Pursuant to 35 U.S.C. §119(a), this application claims the benefit of earlier filing date and right of priority to Korean Application No. 10-2010-0042373, filed on May 6, 2010, the contents of which is hereby incorporated by reference herein in its entirety.

BACKGROUND OF THE INVENTION

1. Field of the Invention

The present invention relates to a mobile terminal, and more particularly, to a mobile terminal and image displaying method therein. Although the present invention is suitable for a wide scope of applications, it is particularly suitable for displaying object relevant information within a preview image.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

According to the related art, a mobile terminal loaded with an augmented reality function displays an image inputted via a camera and is also able to display information (e.g., a name, a representative image, etc.) relevant to a prescribed object within the displayed image.

Moreover, the mobile terminal is able to display information relevant to an object at a point, at which the corresponding object is estimated to be located, in a preview image.

However, the above-mentioned related art does not propose a method of controlling display of the object relevant information included within the preview image.

Moreover, since a plurality of object relevant informations are included in the preview image, in case that the preview image is hindered in being displayed, the related art does not provide a method of sorting and displaying the object relevant informations.

SUMMARY OF THE INVENTION

Accordingly, the present invention is directed to a mobile terminal and image displaying method therein that substantially obviate one or more problems due to limitations and disadvantages of the related art.

An object of the present invention is to provide a mobile terminal and image displaying method therein, by which a display of object relevant information included in a preview image can be effectively controlled.

Another object of the present invention is to provide a mobile terminal and image displaying method therein, by which a plurality of object relevant informations included within a preview image can be effectively sorted and displayed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a camera module receiving an input of an image externally, a display unit displaying the inputted image, the display unit displaying object relevant information of each of a plurality of objects within the inputted image, and a controller obtaining the object relevant information of each of a plurality of the objects, the controller, if receiving an input of a sort command signal for sorting the object relevant information externally, the controller controlling the display unit to sort and display the object relevant information of each of a plurality of the objects to correspond to at least one of a distance, a direction and a category of each of a plurality of the objects.

In another aspect of the present invention, a method of displaying an image in a mobile terminal includes the steps of receiving an input of the image externally, obtaining object relevant information of each of a plurality of objects, displaying the inputted image in a manner of displaying the object relevant information of each of a plurality of the objects within the inputted image, receiving an input of a sort command signal for sorting the object relevant information externally, and sorting and displaying the object relevant information of each of a plurality of the objects according to the input of the sort command signal to correspond to at least one of a distance, a direction and a category of each of a plurality of the objects.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 10A to 10C are diagrams of screen configurations for providing additional information corresponding to object relevant information in accordance with a motion angle of a terminal according to the present invention;

FIGS. 11A to 11C are diagrams of screen configurations for displaying object relevant information meeting a category per time zone only according to the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
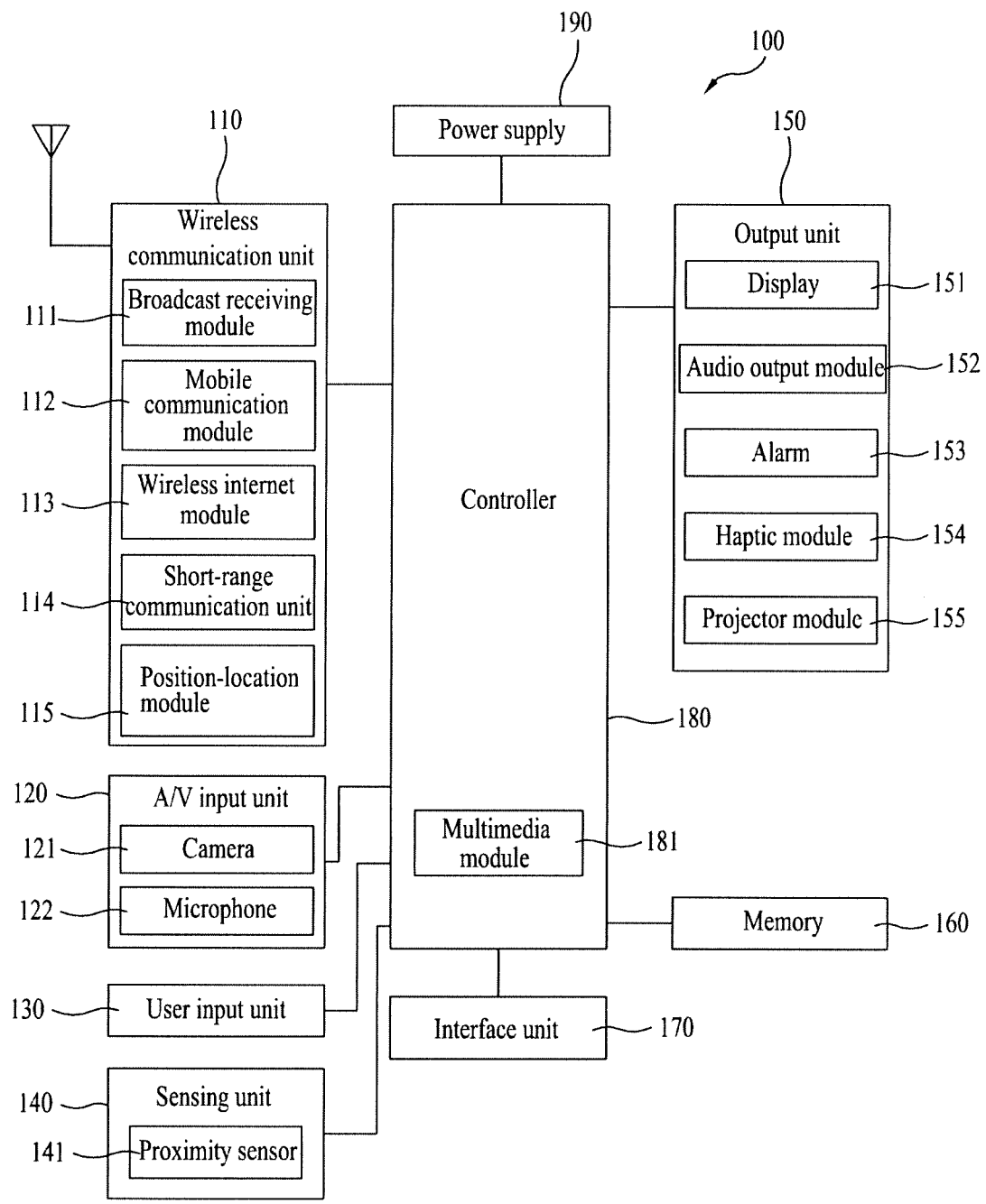
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless interne module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
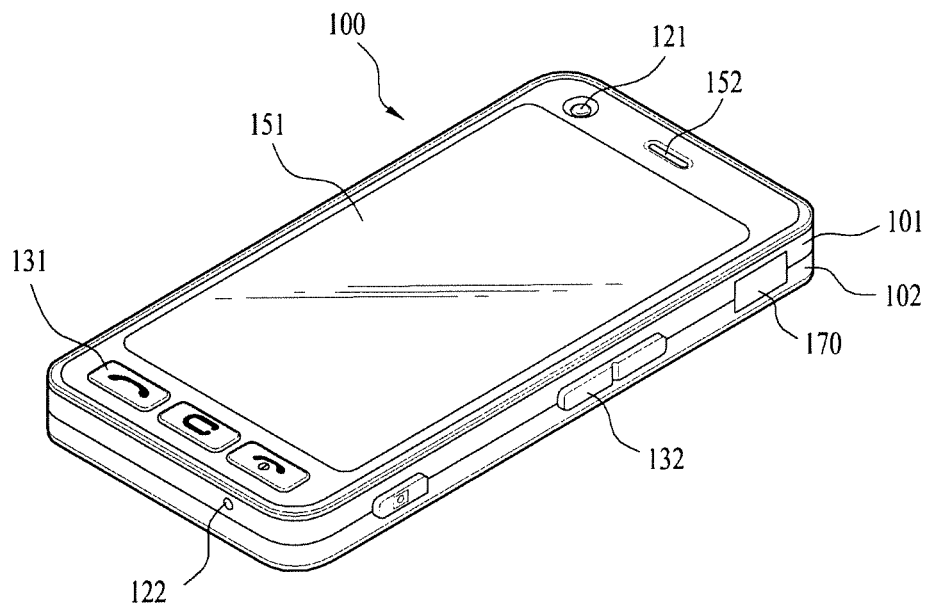
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
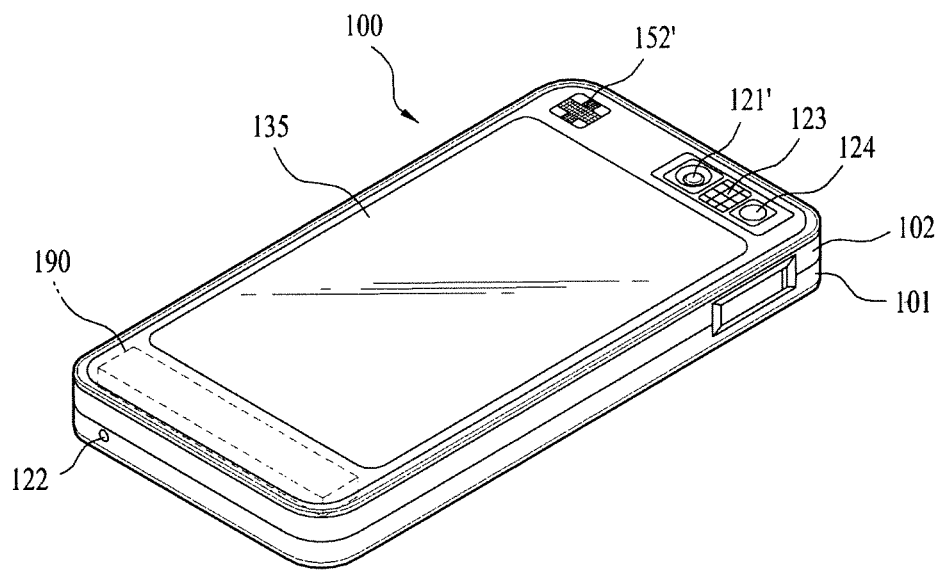
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

Interconnected operational mechanism between the display unit 151 and the touchpad 135 are explained with reference to FIG. 3 as follows.

Figure 3:
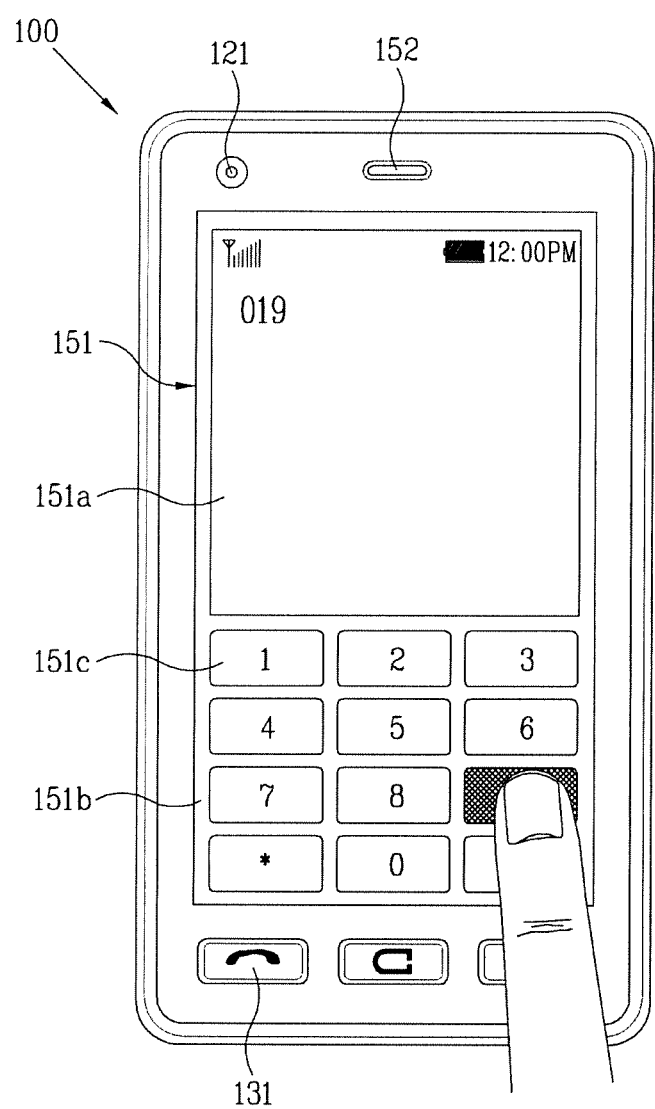
FIG. 3 is front diagram of a mobile terminal according to one embodiment of the present invention for explaining one operational status of the mobile terminal.

FIG. 3 is front-view diagram of a terminal according to one embodiment of the present invention for explaining an operational state thereof.

First of all, various kinds of visual informations can be displayed on the display unit 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

First of all, a mobile terminal mentioned in the following description can include at least one of the components shown in FIG. 1. Moreover, a mobile terminal can include a touch-screen for receiving an input of a touch action from a user and displaying prescribed information simultaneously.

In the following description, a method of displaying an image in a mobile terminal according to the present invention is explained in detail with reference to the accompanying drawings.

Figure 4:
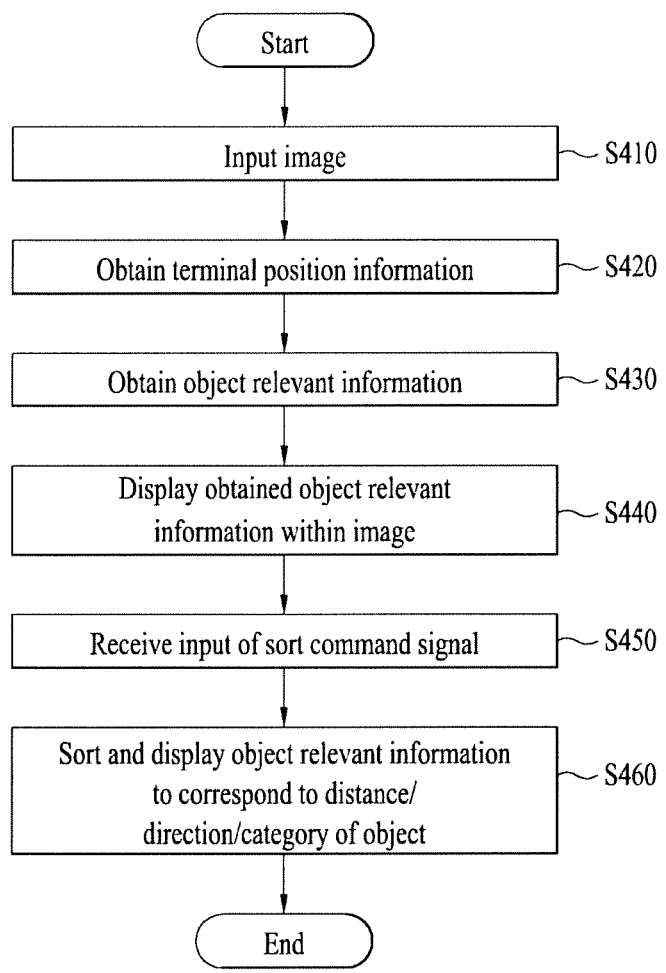
FIG. 4 is a flowchart for a method of displaying an image in a mobile terminal according to one embodiment of the present invention.

FIG. 4 is a flowchart for a method of displaying an image in a mobile terminal according to one embodiment of the present invention.

Referring to FIG. 4, the mobile terminal 100 receives an input of an image externally via the camera 121 [S410].

In case of entering a camera photograph mode or an augmented reality drive mode, the mobile terminal 100 activates the camera 121 and is then able to receive an input of an external image using the activated camera 121. In this case, the camera photograph mode or the augmented reality drive mode can be entered if a corresponding menu item or a corresponding key (or a corresponding key zone) is selected. Moreover, while a preview image inputted using the camera 121 in the camera photograph mode is being displayed, the augmented reality drive mode can be simultaneously entered.

In this case, the augmented reality pertains to a field of virtual reality and is a sort of a computer graphic scheme that synthesizes a virtual object with a real environment to enable the object to look as if existing in an original environment. Therefore, the mobile terminal 100 is able to display a virtual object or image in a manner that the virtual object or image is synthesized over an image representing a real environment inputted via the camera 121 in the augmented reality drive mode.

In particular, the inputted image can include a preview image or a moving picture (i.e., a video) photographed via the camera 121.

In more particular, the inputted image can be zoomed in/out according to user's setting.

The mobile terminal 100 obtains position information of the mobile terminal 100 using the position-location module 115 [S420].

In particular, the mobile terminal 100 is able to obtain its current position information from a satellite using a GPS (global positioning system). For instance, the current position information can include a longitude, a latitude, coordinates and the like of a location at which the mobile terminal 100 is currently located.

And, the position information of the mobile terminal can further include a direction faced by the camera 121 of the mobile terminal 100 at a location where the mobile terminal 100 is currently located. The mobile terminal 100 includes a motion detection sensor (not shown in the drawing) and is able to sense a direction faced by the camera 121 using the motion detection sensor. For instance, the direction faced by the camera 121 can be represented as one of east, west, south and north.

The mobile terminal 100 obtains object relevant information of each of a plurality of objects under the control of the controller 180 [S430]

In particular, the controller 180 in the obtaining step S430 is able to obtain each object relevant information of each of a plurality of objects located within a predetermined distance from the mobile terminal 100 with reference to the obtained terminal position information obtained in the obtaining step S420 under the control of the controller 180.

In this case, the object can include such a thing having its address information (or position information) in a predetermined distance from the mobile terminal 100 as a building, a market, a shopping street and the like. And, the object relevant information is the information relevant to the object and can include at least one of a name of the object (e.g., POI (point of interest)), a representative icon of the object, position information of the object and the like. Besides, there can exist object relevant information on some of all objects located within a predetermined distance from the mobile terminal 100 only.

In more particular, the controller 180 is able to recognize a location, at which the mobile terminal 100 is currently located, using the coordinates information in the obtained terminal position information and is also able to recognize a side in front of the mobile terminal 100 at the currently located location using the direction faced by the camera 121 in the obtained terminal position information. Therefore, the controller 180 is able to obtain object relevant information of each of a plurality of the objects t located within a predetermined distance in front of the mobile terminal 100.

In the following description, the object relevant information obtaining step S430 is explained in detail.

First of all, the mobile terminal 100 enables object relevant information per object to be stored in the memory 160. The mobile terminal 100 is then able to search each object relevant information of a plurality of the objects from the per-object object relevant information previously stored in the memory 160 under the control of the controller 180. In this case, the position information of the object having the corresponding object relevant information can be stored in the memory 160 together with the corresponding object relevant information.

In particular, the controller 180 is able to search the memory 160 for a plurality of the objects having their position information belonging to a range of a predetermined distance in front of the mobile terminal 100 and the object relevant information designated to each of a plurality of the objects. Therefore, if the per-object object relevant information stored in the memory 160 is discovered, the controller 180 is able to obtain the object relevant information of each of a plurality of the objects within the predetermined distance in front of the mobile terminal 100.

Moreover, the per-object object relevant information and the position information previously stored in the memory 160 are received from an external server or can be stored as default in the course of manufacturing the corresponding terminal. Besides, the per-object object relevant information and the position information previously stored in the memory 160 can be updated periodically or at a random timing point.

Subsequently, the mobile terminal 100 is able to receive each object relevant information of a plurality of the objects located within a predetermined distance in front of the mobile terminal 100 from an external server via the wireless communication unit 110.

In particular, the mobile terminal 100 transmits a signal for requesting each object relevant information of a plurality of the objects located within a predetermined distance in front of the mobile terminal 100 to an external server and is then able to receive each object relevant information of a plurality of the objects located within a predetermined distance in front of the mobile terminal 100.

In this case, the request signal includes each position information of a plurality of the objects or a predetermined distance for displaying the position information and object relevant information of the mobile terminal 100.

In the former case, the mobile terminal 100 is able to receive the object relevant information corresponding to the position information included in the request signal from the external server. In the latter case, the mobile terminal 100 is able to receive each object relevant information of a plurality of the objects located within the predetermined distance in front from the current location of the mobile terminal 100 from the external server.

The mobile terminal 100 displays the image inputted in the inputting step S410 and is also able to display the object relevant informations of a plurality of the objects, which were obtained in the obtaining step S430, within the inputted image [S440]. In this case, the displaying step S440 can be performed using the display unit 151 or the touchscreen.

In doing so, the object relevant information is displayed within the inputted image by being interconnected to the corresponding object image. For instance, if the object relevant information indicates ' electronics' and the corresponding object is a  electronics building, the object relevant information ' electronics' can be displayed within the inputted image by being interconnected to an image of the  electronics building.

If an object image corresponding to the object relevant information does not exist within the inputted image, the object relevant information can be displayed at a predicted point where the corresponding object may exist.

Figure 5:
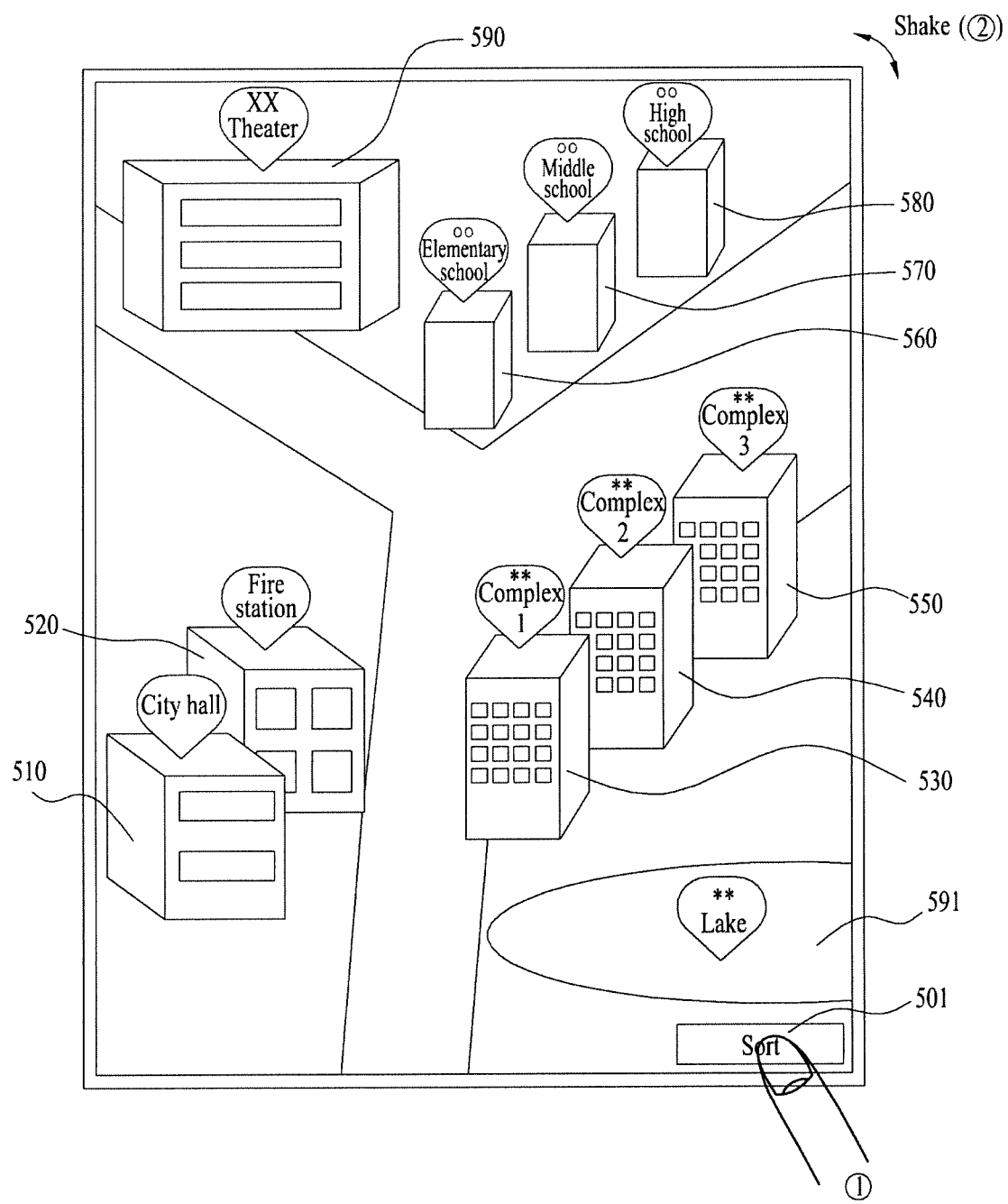
FIG. 5 is a diagram of screen configuration for displaying object relevant information within a preview image according to the present invention.

The displaying step S440 is described in detail with reference to FIG. 5 as follows. For clarity and convenience of the following description, the inputted image is limited to a preview image for example. FIG. 5 is a diagram of screen configuration for displaying object relevant information within a preview image according to the present invention.

Referring to FIG. 5, the mobile terminal displays a preview image inputted via the camera 121 on the screen and is then able to display object relevant informations (e.g., names) of a plurality of object images 510 to 590 and 591 included in the preview image in a manner of interconnecting the object relevant information to each of the corresponding object images.

Meanwhile, if a direction faced by the camera 121 is changed according to a motion of the mobile terminal 100 or the camera 121, the mobile terminal 100 receives an input of a preview image corresponding to the changed direction and then displayed the received preview image. Moreover, the mobile terminal 100 is able to display the preview image in a manner of updating object images of objects located within a predetermined distance in front with reference to the changed direction and object relevant information of the objects [not shown in the drawing].

Meanwhile, in case of receiving an input of a fixing command signal for fixing the object relevant information from a user, the mobile terminal 100 may not update and display the corresponding object relevant information despite the motion of the mobile terminal 100 or the camera 121. For instance, a user is able to input the fixing command signal for fixing the object relevant information in a manner of temporarily turning off the camera 21, temporarily blocking the lens of the camera 121 or selecting a menu item or a key region corresponding to the fixing command for the object relevant information. In doing so, it is able to intactly display the former preview image displayed in case of the input of the fixing command signal instead of changing the preview image according to the change of the direction faced by the camera 121.

Referring now to FIG. 4, the mobile terminal externally receives an input of a sort command signal for sorting the object relevant information via the user input unit 130 [S450].

In this case, the user input unit 130 can include all means for receiving or detecting a user action for inputting the sort command signal.

For instance, referring to FIG. 5, the sort command signal can be inputted if an object relevant information sorting region 501 provided to the screen is selected by a user [①] or the terminal is shaken a predetermined number of times by the user [②]. Alternatively, the sort command signal can be inputted in various ways as well as the above-explained method.

In case of receiving the input of the sort command signal in the inputting step S450, the mobile terminal 100 sorts and display the object relevant informations of a plurality of the objects displayed in the displaying step S440 to correspond to at least one of a distance, direction and category of each of a plurality of the objects located within the predetermined distance from the mobile terminal 100, under the control of the controller 180 [S460]. In this case, the sorting and displaying step S460 can be performed using the display unit 151 or the touchscreen.

In the sorting and displaying step S460, the mobile terminal 100 is able to sort and display the object relevant informations of a plurality of the objects in a grid type table to correspond to the distance and category of the corresponding object under the control of the controller 180. This is described with reference to FIGS. 6A to 6C as follows.

Figure 6A:
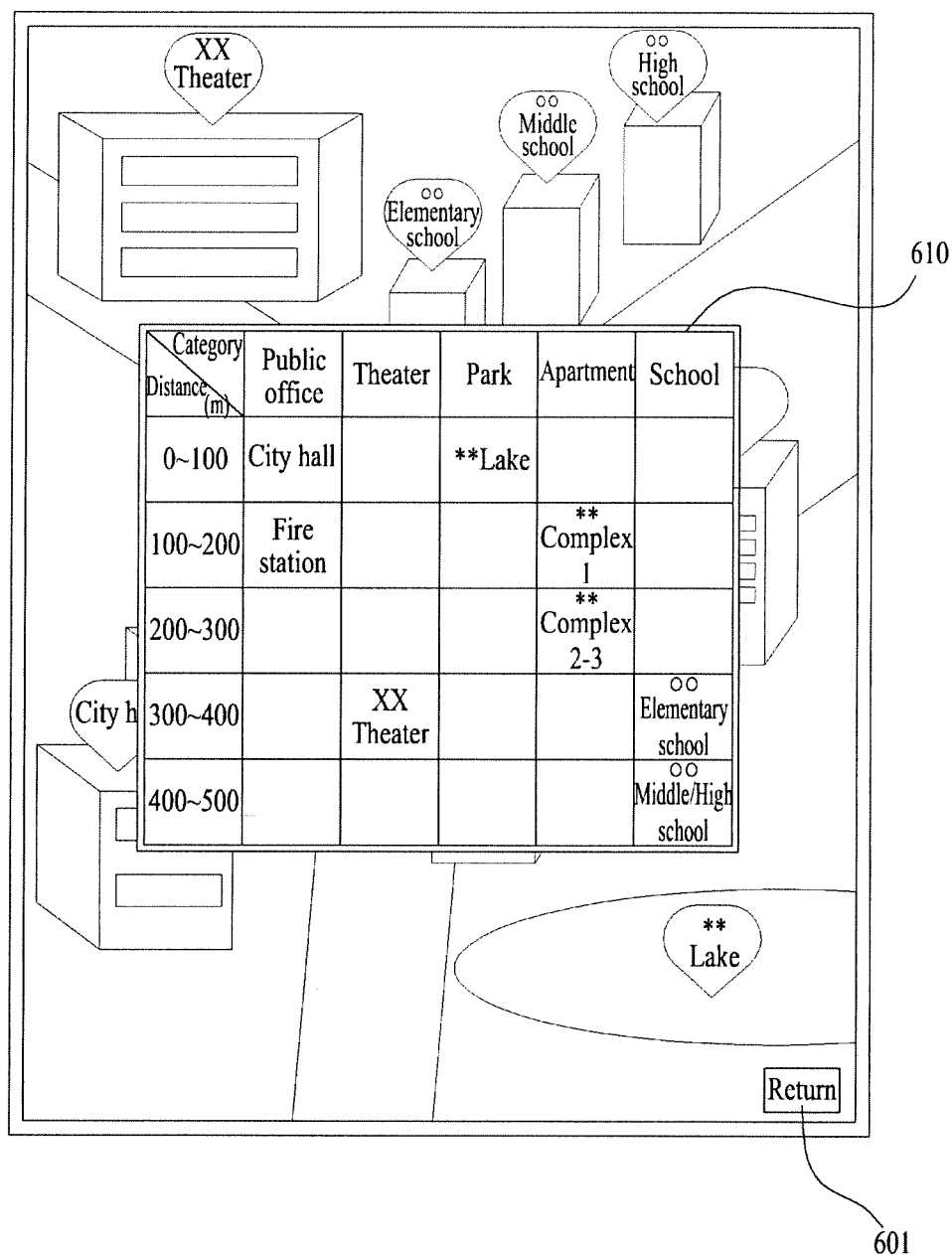
FIGS. 6A to 8 are diagrams of screen configurations for sorting and displaying object relevant information according to the present invention.
Figure 6B:
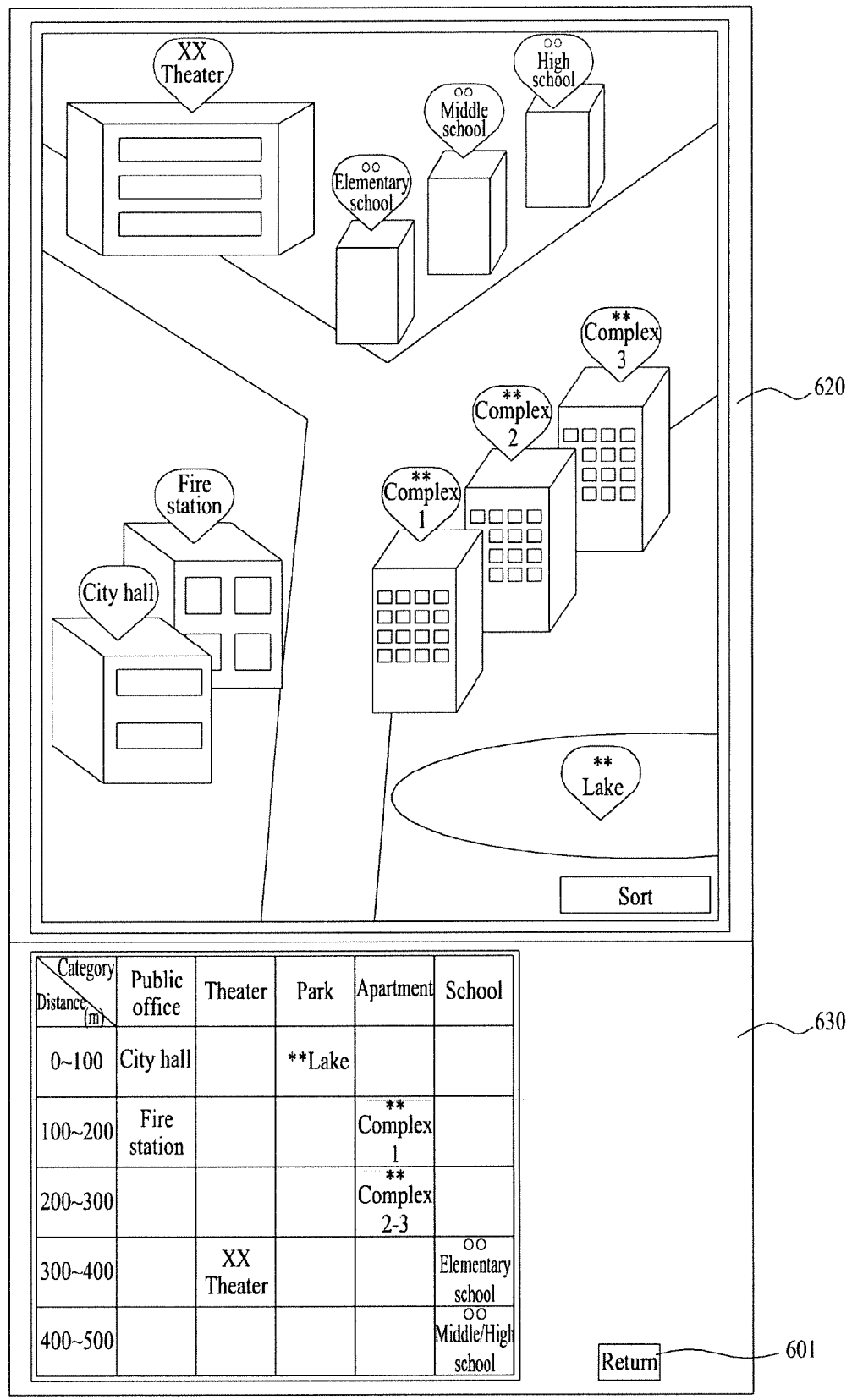

Referring to FIGS. 6A to 6C, in configuring a grid type table, the mobile terminal 100 arranges categories (e.g., public office, theater, park, apartment, school, etc.) of a plurality of objects located within a predetermined distance from the mobile terminal 100 at horizontal variables and also arranged distance ranges from the mobile terminal 100 at vertical variables.

Therefore, object relevant information of each of a plurality of the objects located within the predetermined distance in front from the mobile terminal 100 can be displayed within a section belonging to the corresponding category and the corresponding distance range among a plurality of sections included in the grid type table.

FIG. 6A shows a case that a grid type table is displayed as a popup type. In FIG. 6B, a screen is divided into a plurality of regions including a first region 620 and a second region 630. A preview image (cf. FIG. 5) including object relevant information therein is displayed in the first region 620. And, a grid type table is displayed in the second region 630. In FIG. 6C, a preview image including object relevant information is displayed as a background and a grid type table is displayed as a foreground on a whole screen.

In case that a return zone 601 provided to the screen shown in one of FIGS. 6A to 6C is selected, the mobile terminal 100 interrupts the sorting & display of the object relevant information and is then able to return to the mode or state of displaying the preview image including the object relevant information only [cf. FIG. 5].

Referring now to FIG. 4, in the sorting and displaying step S440, the mobile terminal 100 is able to sort and display the object relevant information of each of a plurality of the objects on a concentric circle to match the distance and direction of the corresponding object under the control of the controller 180. In this case, the concentric circles can include a plurality of circles, each of which radius gradually increases by a predetermined distance unit (e.g., 100 m, etc.) centering on the current location of the mobile terminal 100.

In order to represent the category of the object corresponding to the object relevant information displayed on the concentric circle, the mobile terminal 100 is able to display the object relevant information belonging to the same category using at least one of the same color and the same shape. Therefore, using the color or shape of the object relevant information, a user can be aware of the category the object relevant information belongs to or which object relevant information belongs to the same category.

This is described with reference to FIG. 7 and FIG. 8 as follows.

Figure 7:
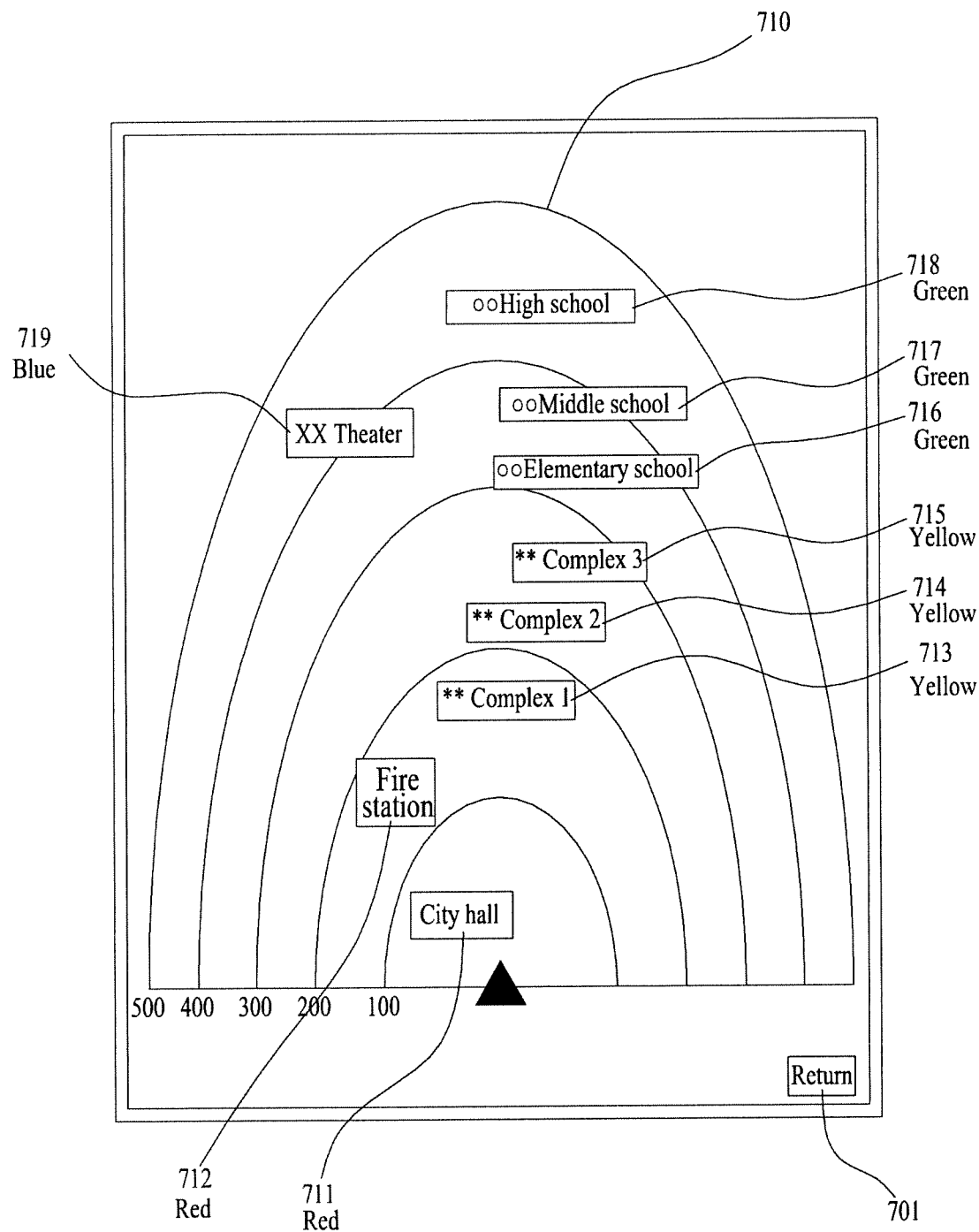

Referring to FIG. 7, the mobile terminal 100 is able to display object relevant informations 711 to 719 at positions on concentric circles corresponding to distances and directions of a plurality of objects from the mobile terminal 100, respectively.

Figure 8:
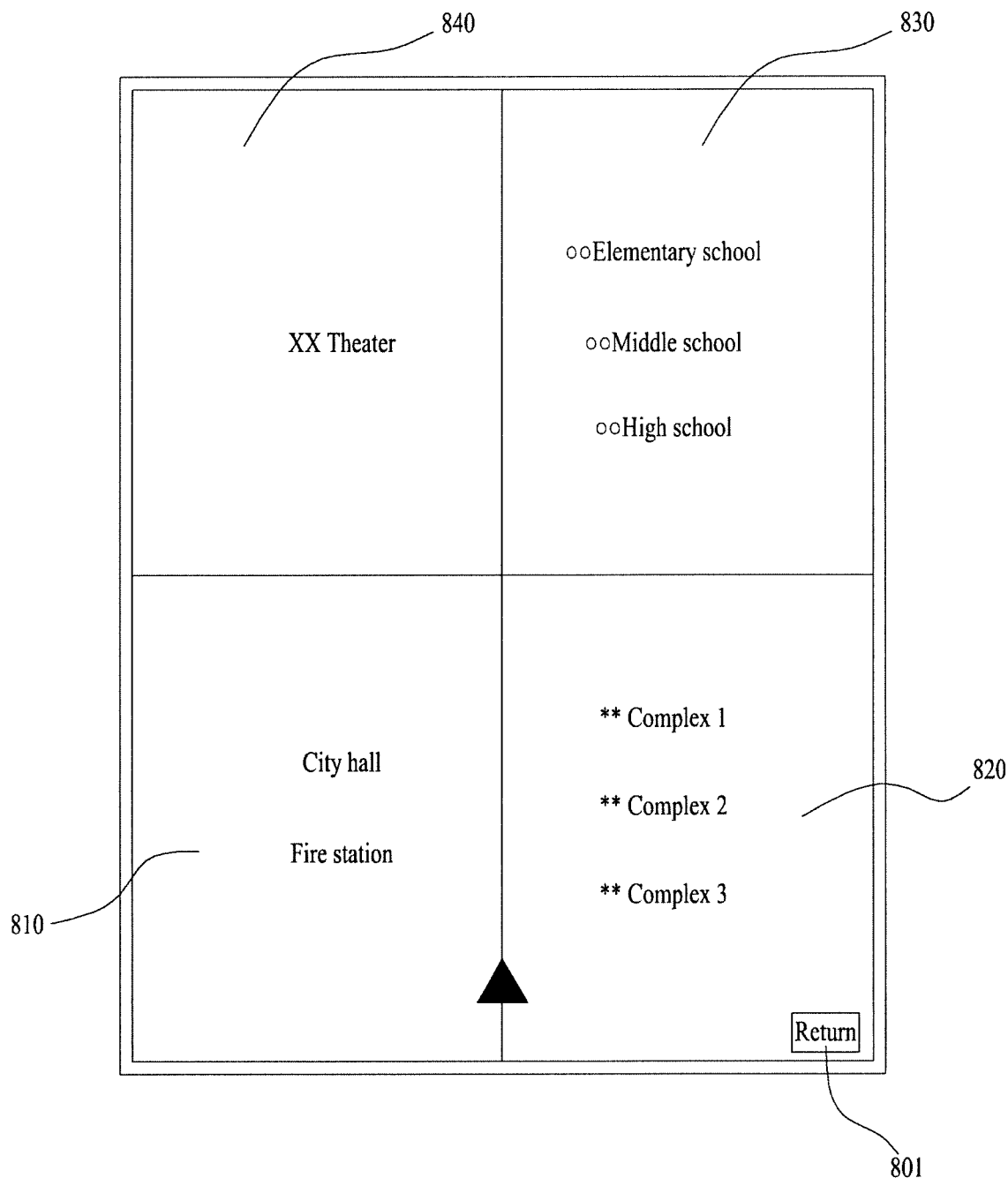

Referring to FIG. 8, the mobile terminal 100 partitions a preview image into f regions 810 to 840 and is then able to display object relevant information of an object, which is located at a place corresponding to each of the regions, in the corresponding region. Therefore, a user can be schematically aware that the corresponding object is located in a prescribed direction and distance from the mobile terminal 100.

Moreover, in FIG. 7 or FIG. 8, the object relevant information can be represented using the color designated to the corresponding category in order to indicate a category of the object corresponding to the object relevant information displayed on the concentric circle 710 or in each of the regions 810 to 840.

For instance, 'city hall' 711 and 'fire station' 712, each of which category is set to a public office, is represented as red. ' complex 1' 713, ' complex 2' 714 and '** complex 3' 715, each of which category is set to an apartment, is represented as yellow. 'oo elementary school' 716, '00 middle school' 717 and 'oo high school' 718, each of which category is set to a school, is represented as green. And, 'xx theater' 719, of which category is set to a theater, is represented as blue.

In case that a return zone 701/801 provided to the screen shown in FIG. 7 or FIG. 8 is selected by a user, the mobile terminal 100 interrupts the sorting & display of the object relevant information and is then able to return to the mode or state of displaying the preview image including the object relevant information only [cf. FIG. 5].

Referring now to FIG. 4, in the sorting and displaying step S440, the mobile terminal 100 is able to distinguishably display the object relevant information, which meets a prescribed condition, under the control of the controller 180.

For instance, the prescribed condition can include one of a use frequency (or a visit frequency) of an object corresponding to object relevant information, a user evaluation on an object corresponding to object relevant information, etc. Therefore, the distinguishable extent of the object relevant information can be raised in order of high use frequency or good user evaluation.

This is described in detail with reference to FIG. 9A and FIG. 9B as follows.

Figure 9A:
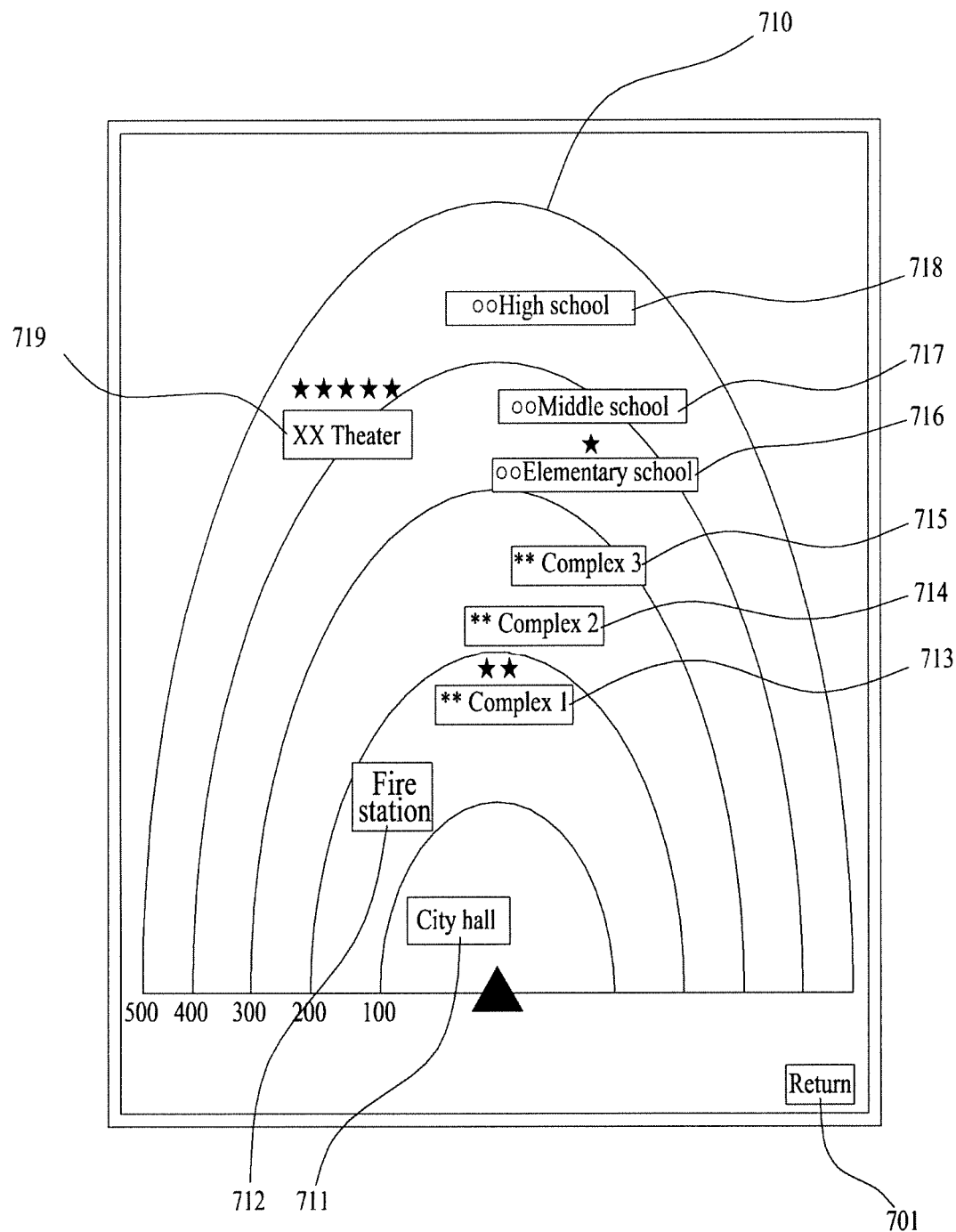
FIG. 9A and FIG. 9B are diagrams of screen configurations for distinguishably displaying object relevant information meeting a prescribed condition in the course of sorting and displaying object relevant information according to the present invention.
Figure 9B:
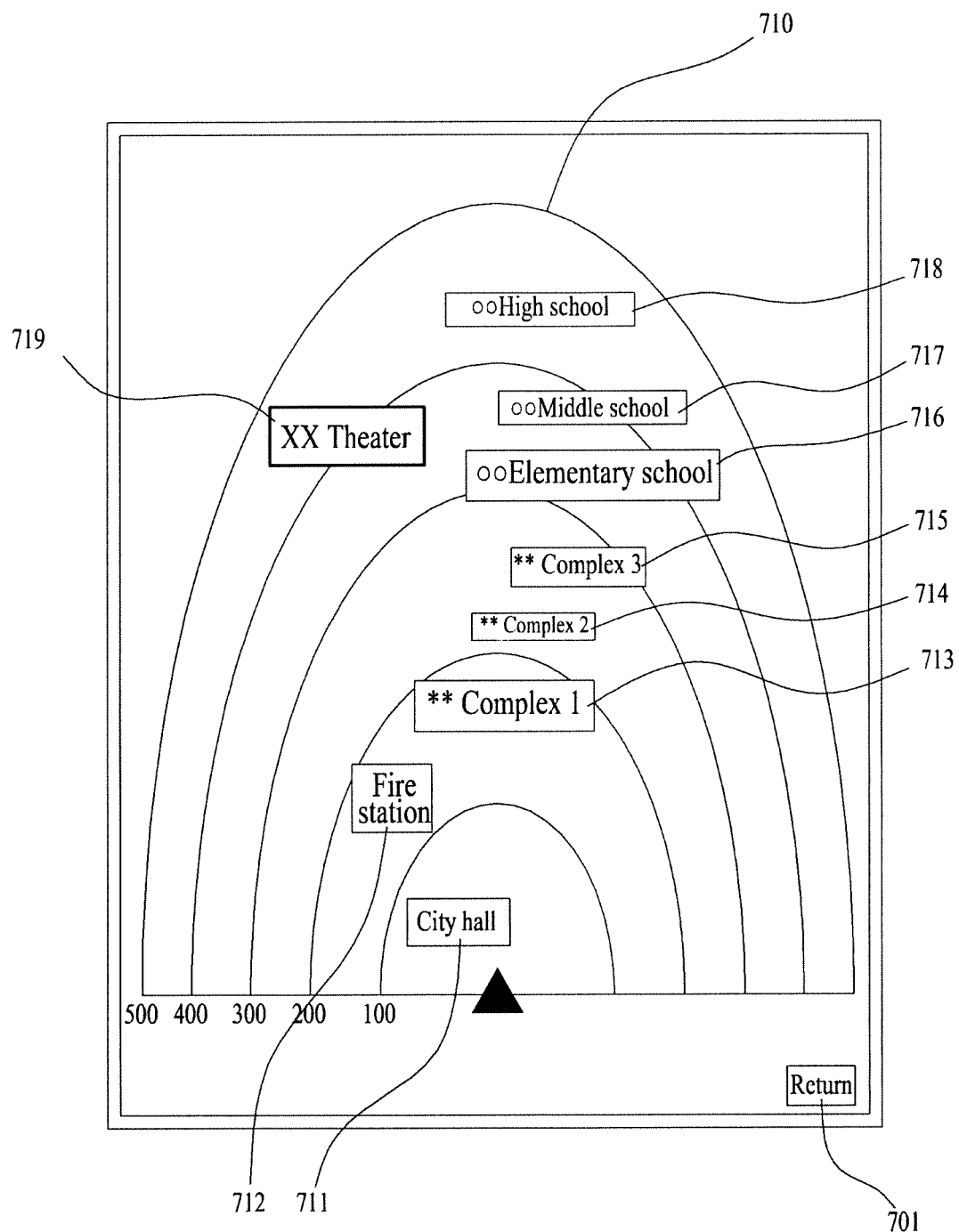

FIG. 9A and FIG. 9B are diagrams of screen configurations for distinguishably displaying object relevant information, which meets a prescribed condition, in the course of sorting and displaying object relevant information according to the present invention.

Referring to FIG. 9A, in order to indicate a frequency of user's visit to an object corresponding to object relevant information, the mobile terminal 100 is able to display an indicator (e.g., stars) together with the corresponding object relevant information.

For instance, if the visit frequency is 15 times or more per month, it can be represented as 5 starts. If the visit frequency is 6~8 times per month, it can be represented as 2 starts. If the visit frequency is 1~3 times per month, it can be represented as 1 start. If the visit frequency is zero time per month, the corresponding object is not marked with any indicator.

Referring to FIG. 9B, in order to indicate a user evaluation on an object corresponding to object relevant information, a display size of the corresponding object relevant information can vary.

For instance, the better the user evaluation gets, the bigger the display size of the corresponding object relevant information becomes. The user evaluation can be classified into 'very good', 'good', 'normal', 'poor' and the like. And, a display size of object relevant information on each user evaluation can be set in advance.

Referring now to FIG. 4, in the sorting and display step S440, the mobile terminal is able to display additional information on the object corresponding to the sorted and displayed object relevant information to correspond to an incline angle of the mobile terminal 100 under the control of the controller 180.

In this case, the additional information on the object can include a phone number of the object, an important notification of the object, an available date/hour of the object, a homepage address of the object and the like.

In case that the mobile terminal 100 is inclined, the mobile terminal 100 determines an incline angle and is then able to display additional information corresponding to the determined incline angle. Moreover, if the mobile terminal 100 is inclined in one of top, bottom, left and right directions, the mobile terminal 100 determines an incline direction and is then able to display additional information corresponding to the determined incline direction. Of course, by determining both of the incline direction and the incline angle in the incline action, the mobile terminal 100 is able to display corresponding additional information.

In particular, the displayed additional information may differ according to the incline angle or the incline direction. In this case, information indicating what kind of additional information will be provided per incline angle or direction is previously stored in the memory 160.

This is explained in detail with reference to FIGS. 10A to 10C as follows. For clarity and convenience of the following description, assume a case that the mobile terminal 100 is inclined at a predetermined angle in a top direction. And, assume that object relevant information is displayed using a grid type table.

Figure 10A:
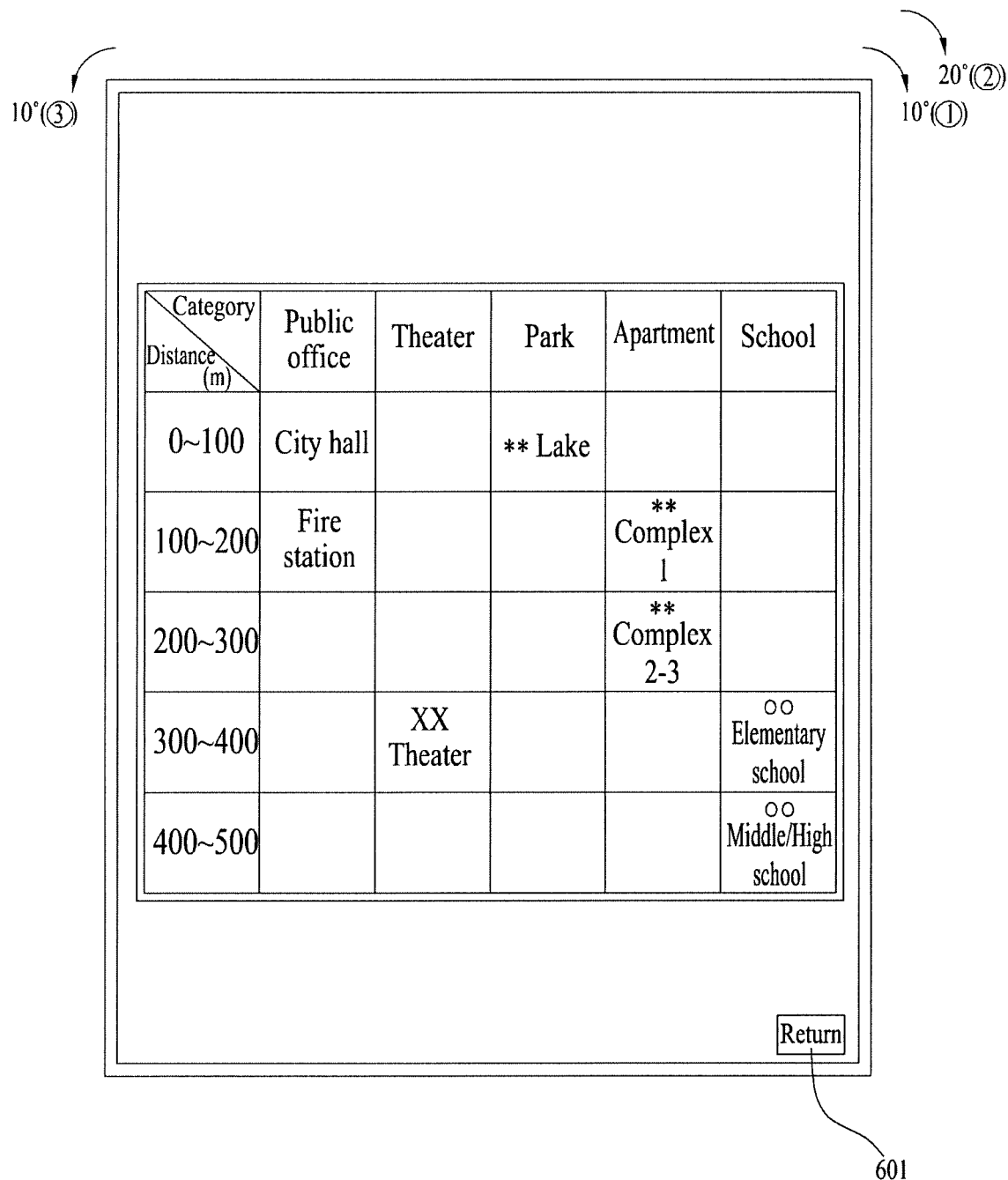

FIGS. 10A to 10C are diagrams of screen configurations for providing additional information corresponding to object relevant information in accordance with a motion angle of a terminal according to the present invention.

Referring to FIG. 10A, in the sort and display mode of the object relevant information, the mobile terminal 100 can be moved at a predetermined angle in bottom direction [①, ②] or top direction [③] with reference to a topside of the mobile terminal 100 (or top direction).

Referring to FIG. 10B, in case that the mobile terminal 100 is inclined at 10 degrees in bottom direction with reference to the topside [①], it is able to display a phone number of an object corresponding to object relevant information displayed in each section of a grid type table.

Referring to FIG. 10C, in case that the mobile terminal 100 is inclined at 20 degrees in bottom direction with reference to the topside [②], it is able to display an important notification of an object corresponding to object relevant information displayed in each section of a grid type table.

Moreover, if the incline extent increases at 30 degrees, 40 degrees, etc. by a unit of 10 degrees, it is able to sequentially display additional information corresponding to each incline angle.

Referring now to FIG. 4, in the sorting and displaying step S440, the mobile terminal sorts out an object belonging to a category corresponding to a current time zone among a plurality of the objects to correspond to the category per time zone under the control of the controller 180 and is then able to sort and display the object relevant information on the sorted object.

In this case, the information on the category per time zone may be stored in the memory 160 in advance. In particular, the category per time zone is specified by a user or can be automatically specified by the mobile terminal 100.

For instance, the category per time zone can include the public office and school between AM 09:00 and AM 12:00, the restaurant and theater between AM 12:00 and PM 03:99, or the restaurant, institute and library between PM 0600 and PM 09:00.

Therefore, if a current hour is AM 10:00, since a time zone (hereinafter named a current time zone), to which the current hour belongs, ranges between AM 09:00 and AM 12:00, the mobile terminal 100 is able to sort and display the object relevant information corresponding to the object belonging to the category 'public office or school'.

Moreover, it is able to sort out objects using a category per day of the week or a category per place. For instance, Monday 'school', Tuesday 'restaurant', and Wednesday 'institute' can be included in the category per day of the week. If today is Monday, it is able to sort out the object having the category set to 'school' only. Gangnam Station 'restaurant, theater' and oo University 'library, institute' can be included in the category per place. If the mobile terminal 100 is currently located at Gangnam Station, it is able to sort out the object having the category set to 'restaurant or theater' only.

Figure 11A:
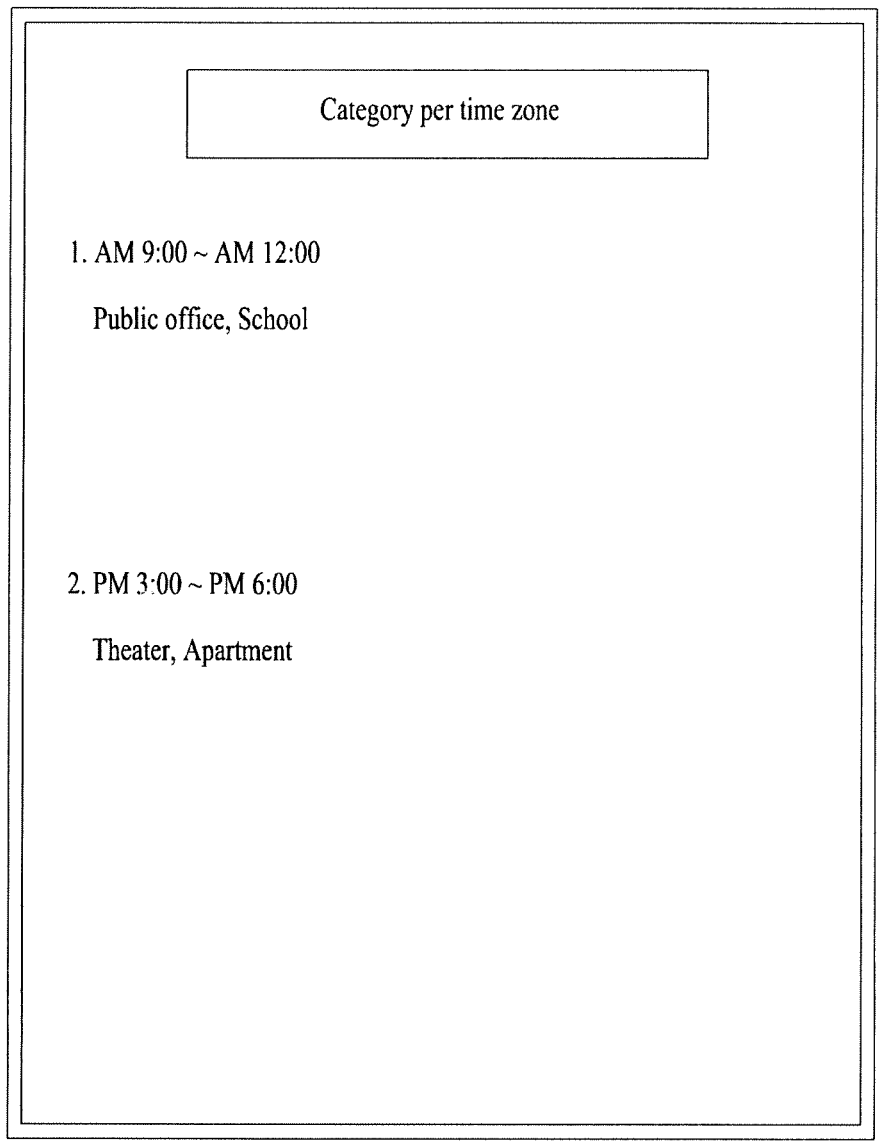
Figure 11C:
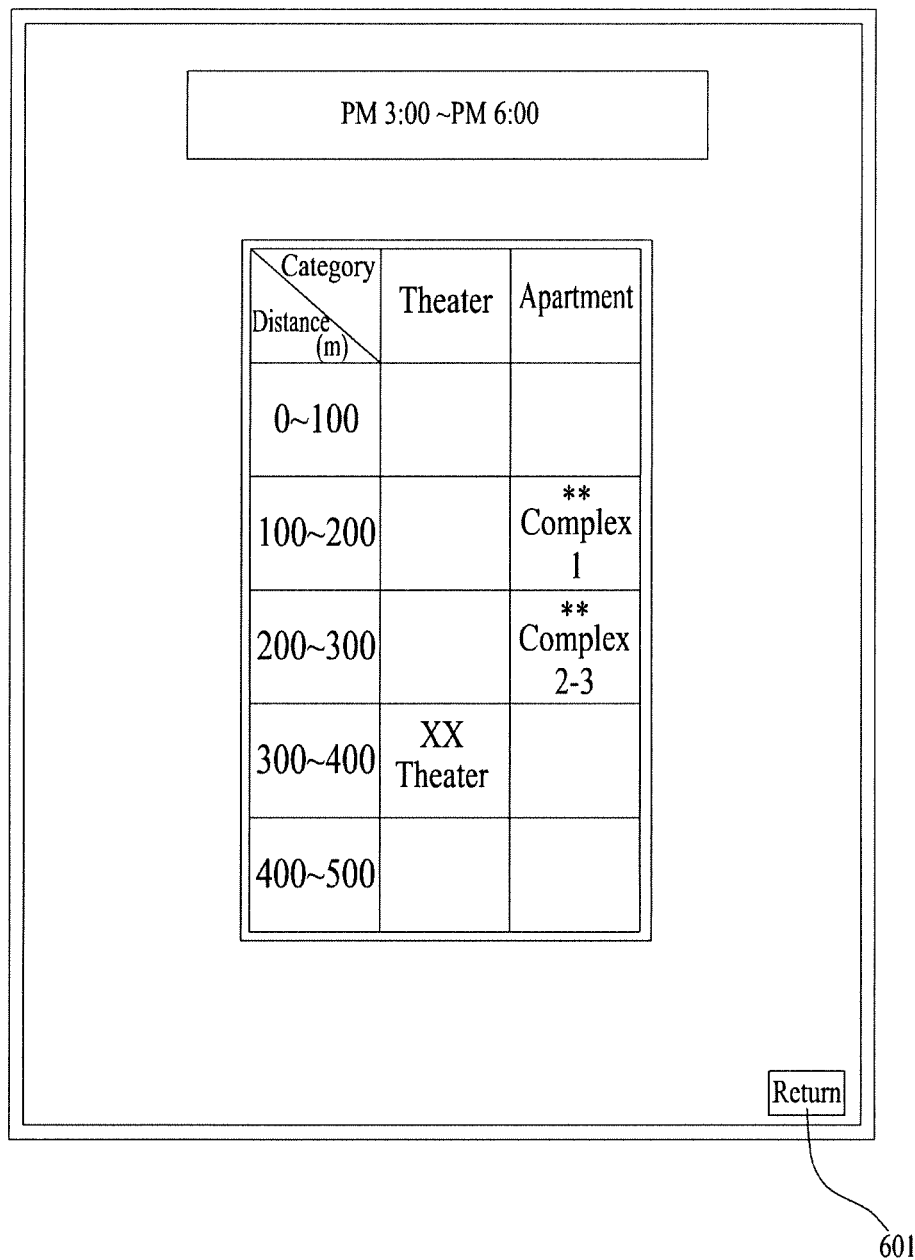

In the following description, the sorting and display of object relevant information, which meets the category per time zone, are explained in detail with reference to FIGS. 11A to 11C. FIGS. 11A to 11C are diagrams of screen configurations for displaying object relevant information meeting a category per time zone only according to the present invention.

Referring to FIG. 11A, it can be observed that the category 'public office, school' is designated between AM 09:00 and AM 12:00. And, it can be observed that the category 'theater, apartment' is designated between PM 03:00 and PM 06:00.

Referring to FIG. 11B, if a current hour is AM 10:00, since a current time zone is between AM 09:00 and AM 12:00, the mobile terminal 100 is able to display object relevant information of an object, of which category is 'public office or school', among a plurality of objects located within a predetermined distance in front from the mobile terminal 100 only.

Referring to FIG. 11C, if a current hour is PM 05:00, since a current time zone is between AM 03:00 and PM 06:00, the mobile terminal 100 is able to display object relevant information of an object, of which category is 'theater or apartment', among a plurality of objects located within a predetermined distance in front from the mobile terminal 100 only.

Referring now to FIG. 4, in case that a user selects specific object relevant information specific object relevant information from a plurality of the sorted and displayed object relevant informations via the user input unit 130, the mobile terminal is able to distinguishably display the selected specific object relevant information within the inputted image (or the preview image) under the control of the controller 180.

Figure 12A:
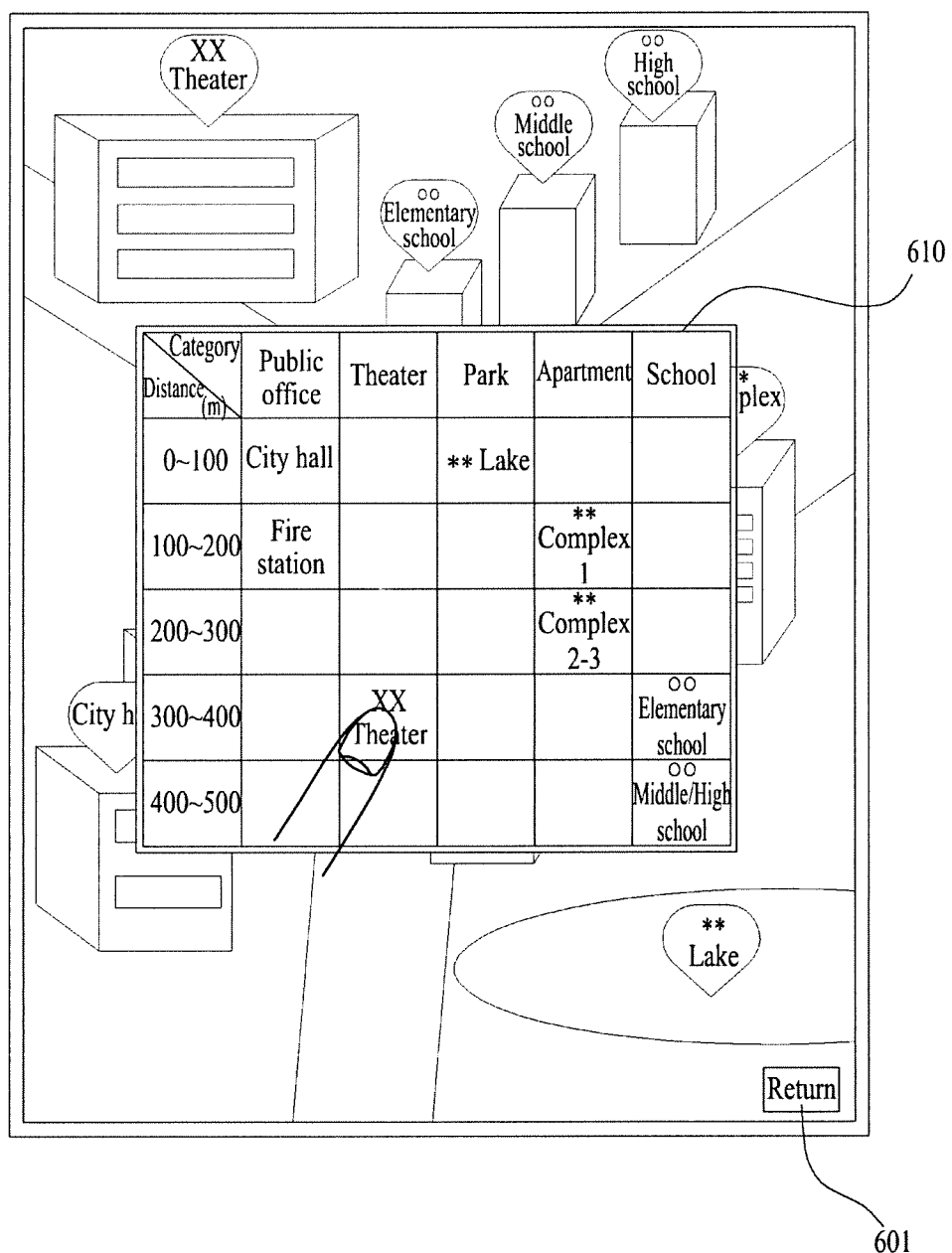
FIG. 12A and FIG. 12B are diagrams of screen configurations for distinguishably displaying specific object relevant information within a preview image in case of selecting the specific object relevant information from sorted and displayed object relevant informations according to the present invention.
Figure 12B:
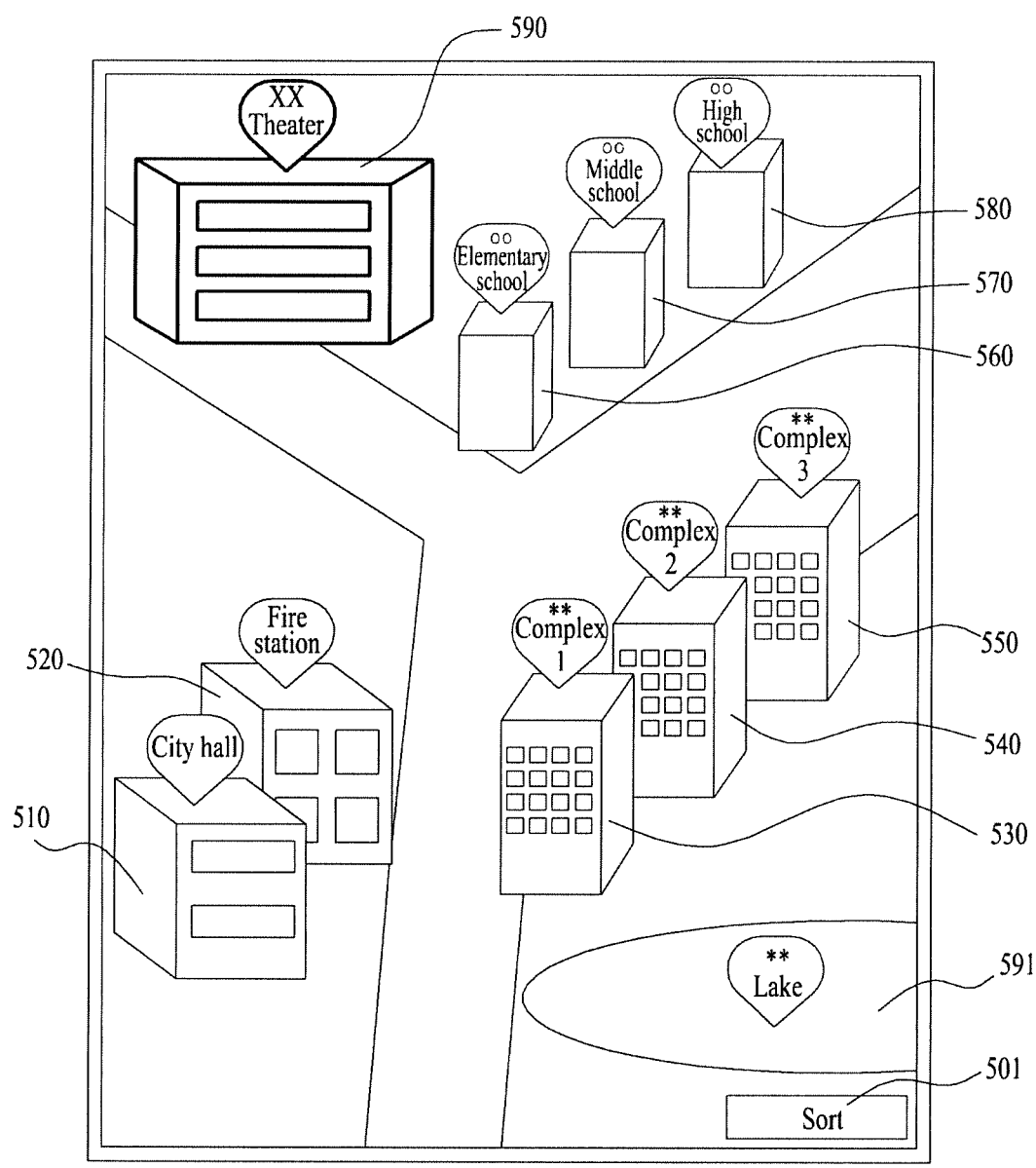

This is described in detail with reference to FIG. 12A and FIG. 12B as follows. FIG. 12A and FIG. 12B are diagrams of screen configurations for distinguishably displaying specific object relevant information within a preview image in case of selecting the specific object relevant information from the sorted and displayed object relevant informations according to the present invention. For clarity and convenience of the following description, assume that object relevant information is displayed using a grid type table.

In case that a user selects specific object relevant information ' theater' from the object relevant informations sorted and displayed using the grid type table [FIG. 12A], the mobile terminal 100 interrupts the sorting and display of the object relevant information and is then able to return to the state of displaying the preview image including the object relevant information [FIG. 12B]. In doing so, the specific object relevant information ' theater' can be distinguishably displayed within the preview image including the object relevant information.

Referring now to FIG. 4, in case of detecting a motion in a horizontal direction to change a center axis of the mobile terminal 100 in the course of performing the sorting and displaying step S460, the mobile terminal 100 is able to control the sorting and display of the object relevant information. In this case, the mobile terminal 100 is provided with a motion detect sensor and is able to detect the motion in the horizontal direction.

The above-described incline action of the mobile terminal 100 is a case that the center axis of the mobile terminal 100 is not changed. And, the motion of the mobile terminal 100 in the horizontal direction can be accompanied by the change of the center axis of the mobile terminal 100. Therefore, in case that the mobile terminal 100 moves in the horizontal direction, since the direction faced by the camera 121 is changed, the image inputted via the camera 121 is changeable.

Figure 13A:
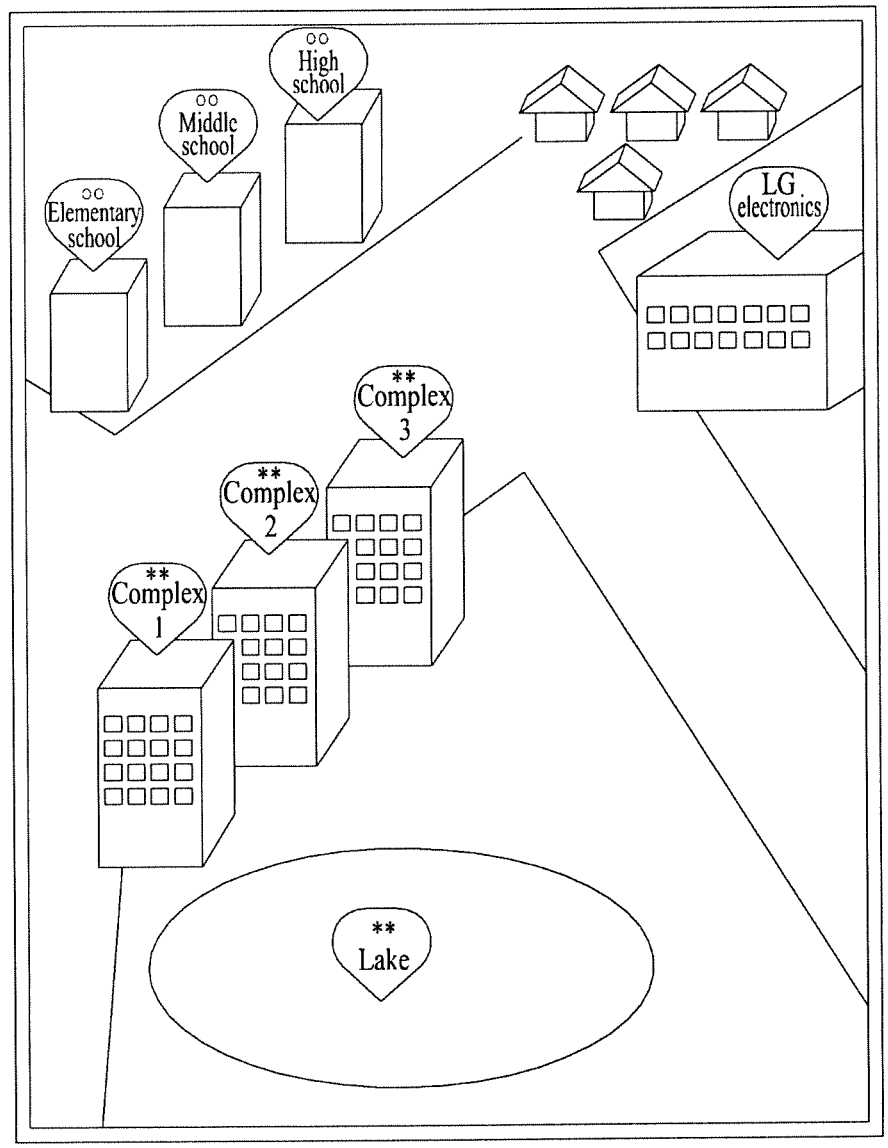
FIG. 13A and FIG. 13B are diagrams of screen configurations for controlling a sort & display in changing a horizontal direction of a terminal according to the present invention.
Figure 13B:
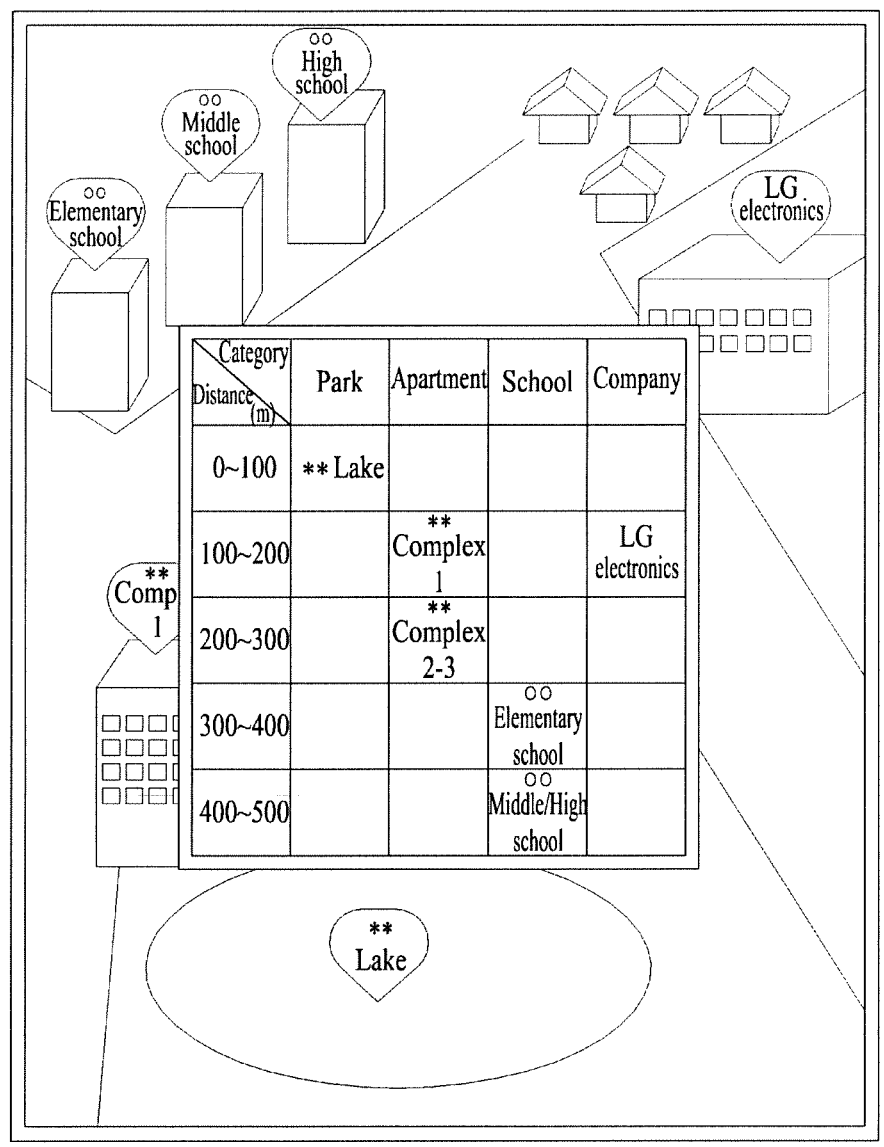

This is described in detail with reference to FIG. 13A and FIG. 13B as follows. FIG. 13A and FIG. 13B are diagrams of screen configurations for controlling a sort & display in changing a horizontal direction of a terminal according to the present invention.

Referring to FIG. 13A, in case of detecting a motion over a predetermined reference in a horizontal direction, the mobile terminal 100 interrupts the sorting and display of the object relevant information and is then able to display a preview image inputted from the direction of the motion together with corresponding object relevant informations [cf. FIG. 5].

In this case, the motion over the predetermined reference can include a case that a preview image before the motion fails to match a preview image after the motion over a predetermined percentage or a case that a motion angle in a horizontal direction is equal to or greater than a predetermined reference.

Referring to FIG. 13B, in case of detecting a motion over a reference in a horizontal direction, the mobile terminal 100 is able to update the sorted and displayed object relevant information. In particular, the mobile terminal 100 is able to sort and display object relevant informations of a plurality of objects located within a predetermined distance in front from the mobile terminal 100.

In the following description, a method of displaying a preview image including object relevant information is explained in detail with reference to the accompanying drawings.

First of all, according to the present invention, in case of displaying a plurality of object relevant informations within a preview image, if the object relevant information positioned in rear is partially or entirely blocked by the object relevant information positioned in front, the mobile terminal 100 is able to effectively display the blocked object relevant information.

This is explained with reference to FIGS. 14A to 14C as follows.

Figure 14A:
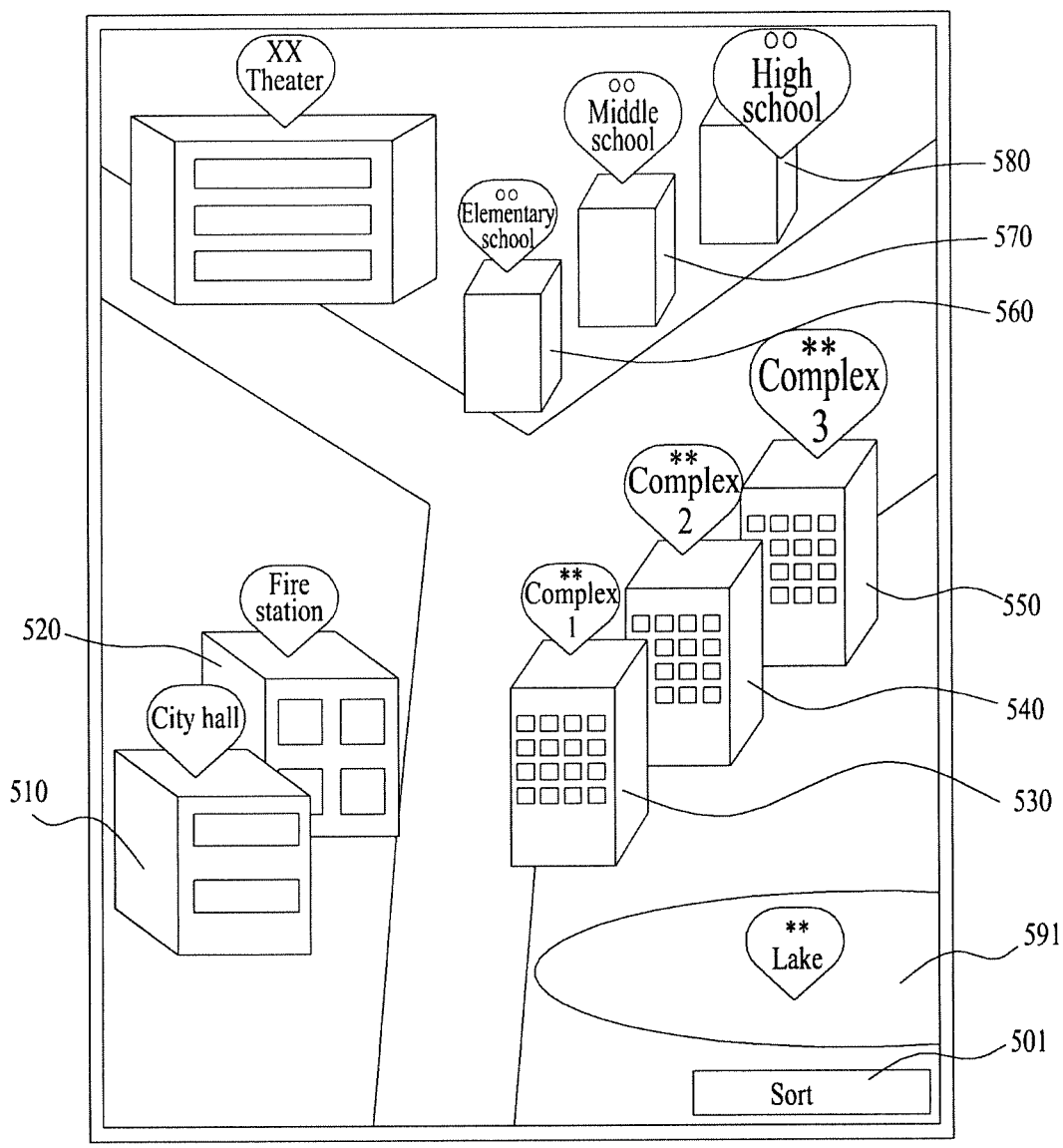
FIGS. 14A to 14C are diagrams of screen configurations for displaying object relevant information partially blocked within a preview image according to the present invention.
Figure 14B:
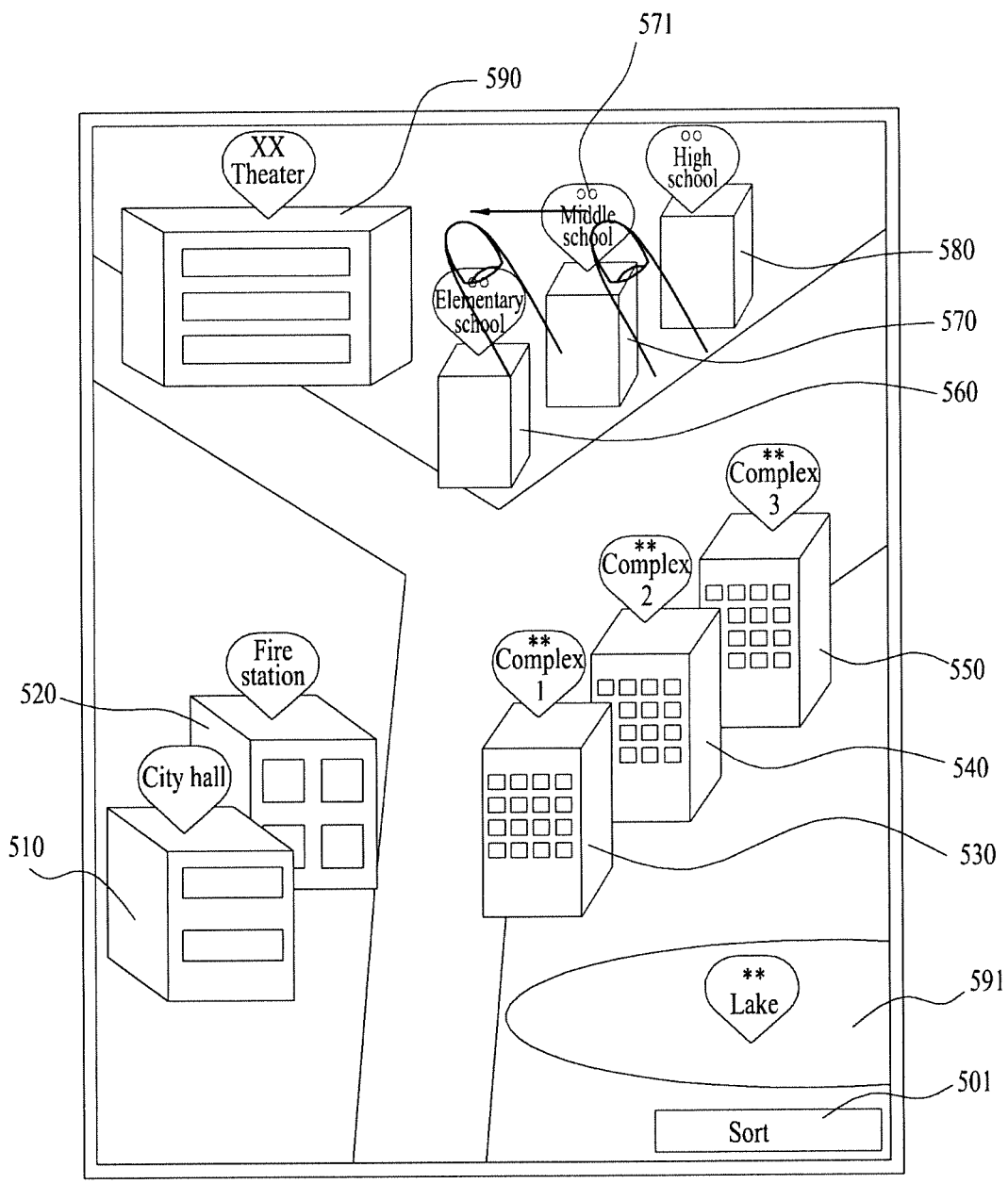
Figure 14C:
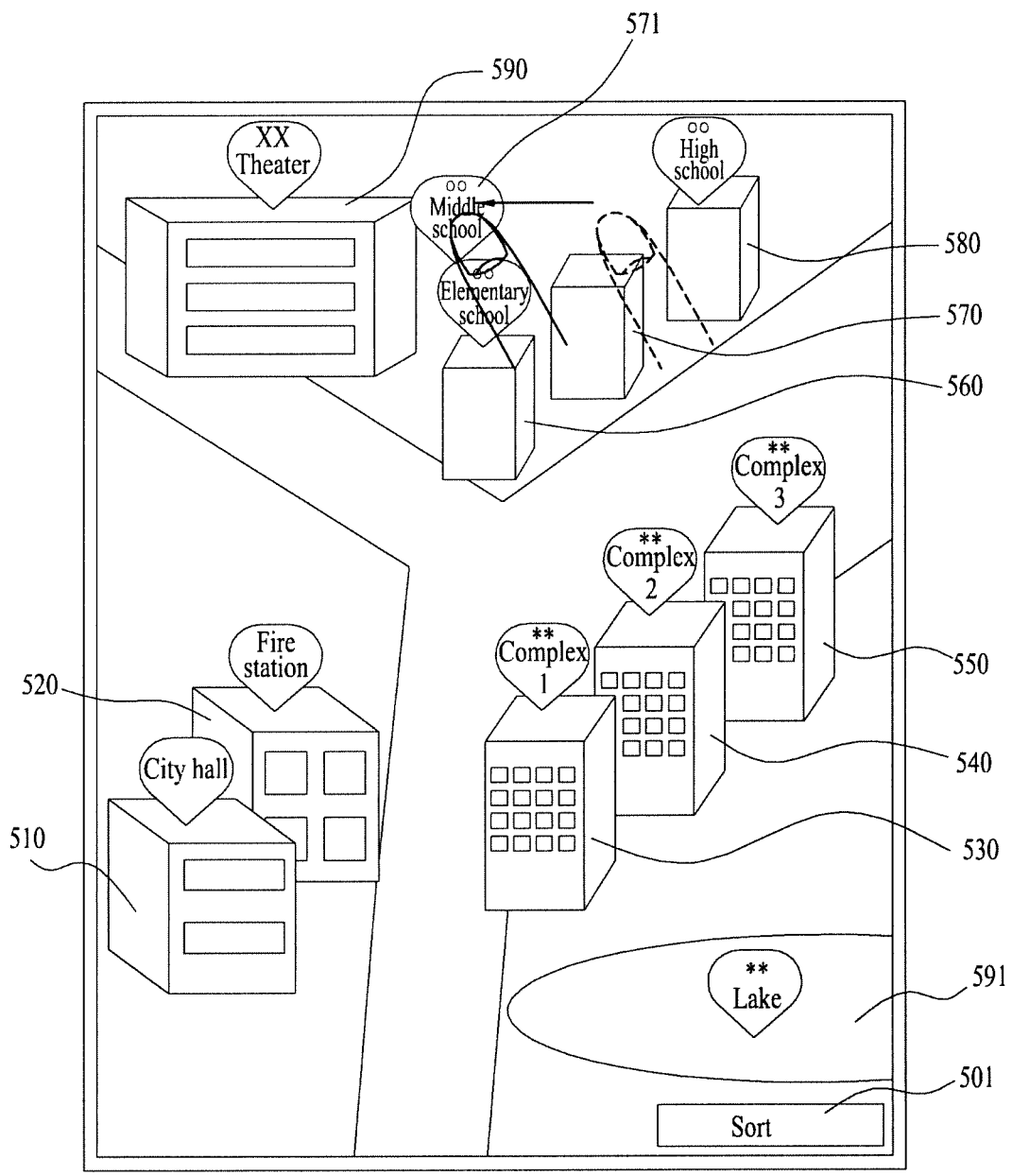

FIGS. 14A to 14C are diagrams of screen configurations for displaying object relevant information partially blocked within a preview image according to the present invention.

Referring to FIG. 14A, when a plurality of object relevant informations are displayed by being overlapped with each other, a display region of the object relevant information positioned in rear is set bigger than that of the object relevant information positioned in front. Therefore, the mobile terminal 100 enables the object relevant information positioned in rear to be entirely displayed without being blocked.

Moreover, when a plurality of object relevant informations are displayed by being overlapped with each other, the mobile terminal 100 is able to display the object relevant information positioned in rear by moving the corresponding object relevant information aside in a predetermined distance in order to prevent the object relevant information positioned in rear from being blocked by the object relevant information positioned in front.

Meanwhile, when a plurality of object relevant informations are displayed by being overlapped with each other, the mobile terminal 100 receives an input of a touch & drag action from one point of the object relevant information 571 positioned in rear to another point on the screen from a user [FIG. 14B] and then displays the object relevant information 571 positioned in rear by moving the corresponding object relevant information 571 to the point at which the touch & drag action ends [FIG. 14C]. If the touch by the inputted touch & drag action is released, the mobile terminal 100 enables the moved object relevant information 571 to return to its original position and then displays the corresponding object relevant information at the original position [cf. FIG. 14B].

According to the present invention, if definition of a preview image including object relevant information is equal to or smaller than a predetermined reference, the mobile terminal 100 transmits a request signal for a virtual preview image corresponding to a currently displayed preview image using the wireless communication unit 130 and is then able to receive the virtual preview image from an external server via the wireless communication unit 130 as a result of the request signal transmission.

Therefore, the mobile terminal 100 displays the received virtual preview image instead of the preview image actually inputted via the camera 121 and is then able to display the corresponding object relevant information at the corresponding location within the virtual preview image.

In this case, the request signal can include current position information and information on a preview image size. Therefore, the external server searches a virtual preview image matching the current position information and the preview image size and is then able to transmit the discovered virtual preview image to the mobile terminal 100.

Meanwhile, the virtual preview image can be stored in the memory 160 in advance. In this case, a virtual preview image corresponding to a currently display preview image can be displayed by searching the memory 160 for the corresponding virtual preview image.

Figure 15A:
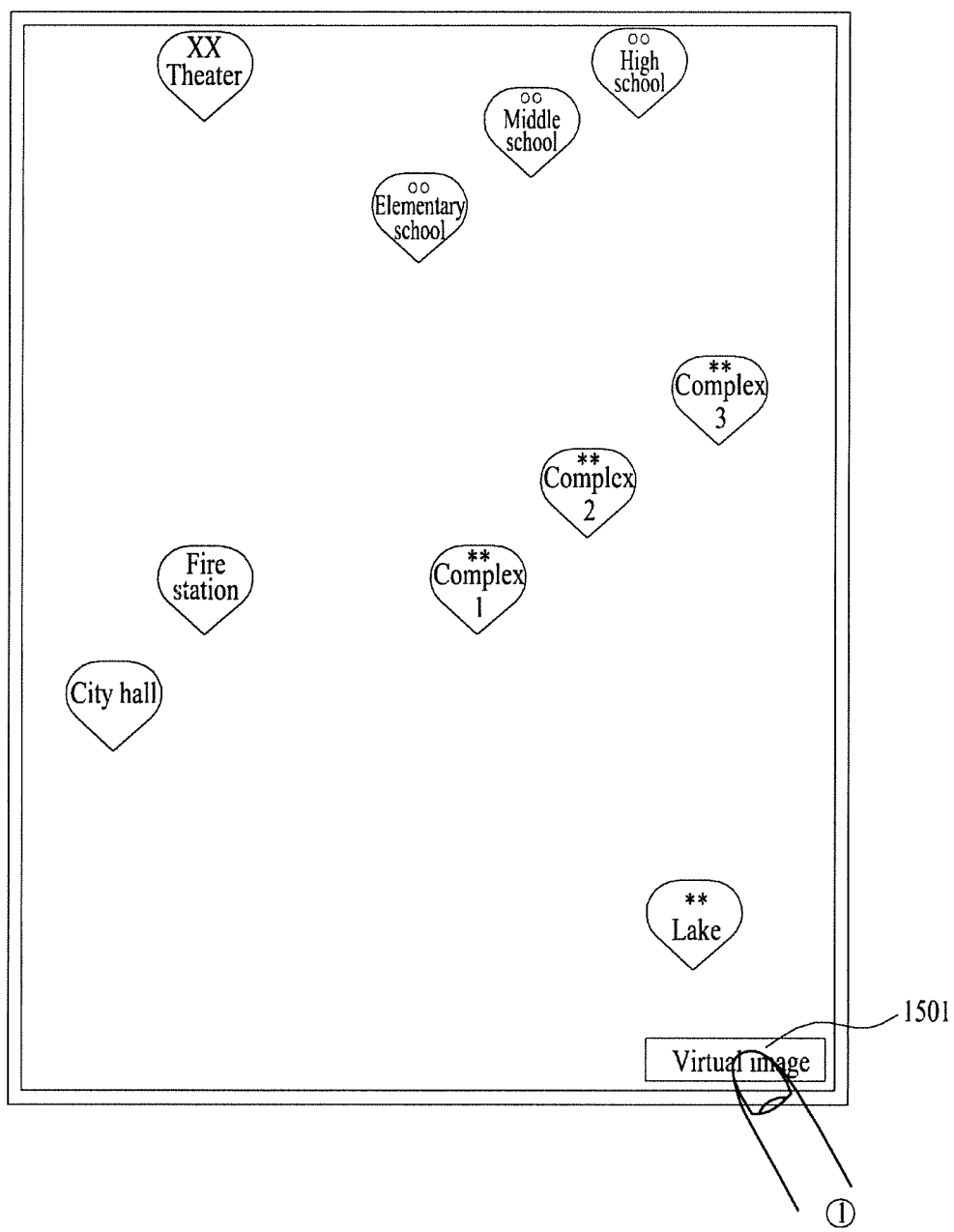
FIG. 15A and FIG. 15B are diagrams of screen configurations for displaying an image provided by a server instead of a preview image according to the present invention.
Figure 15B:
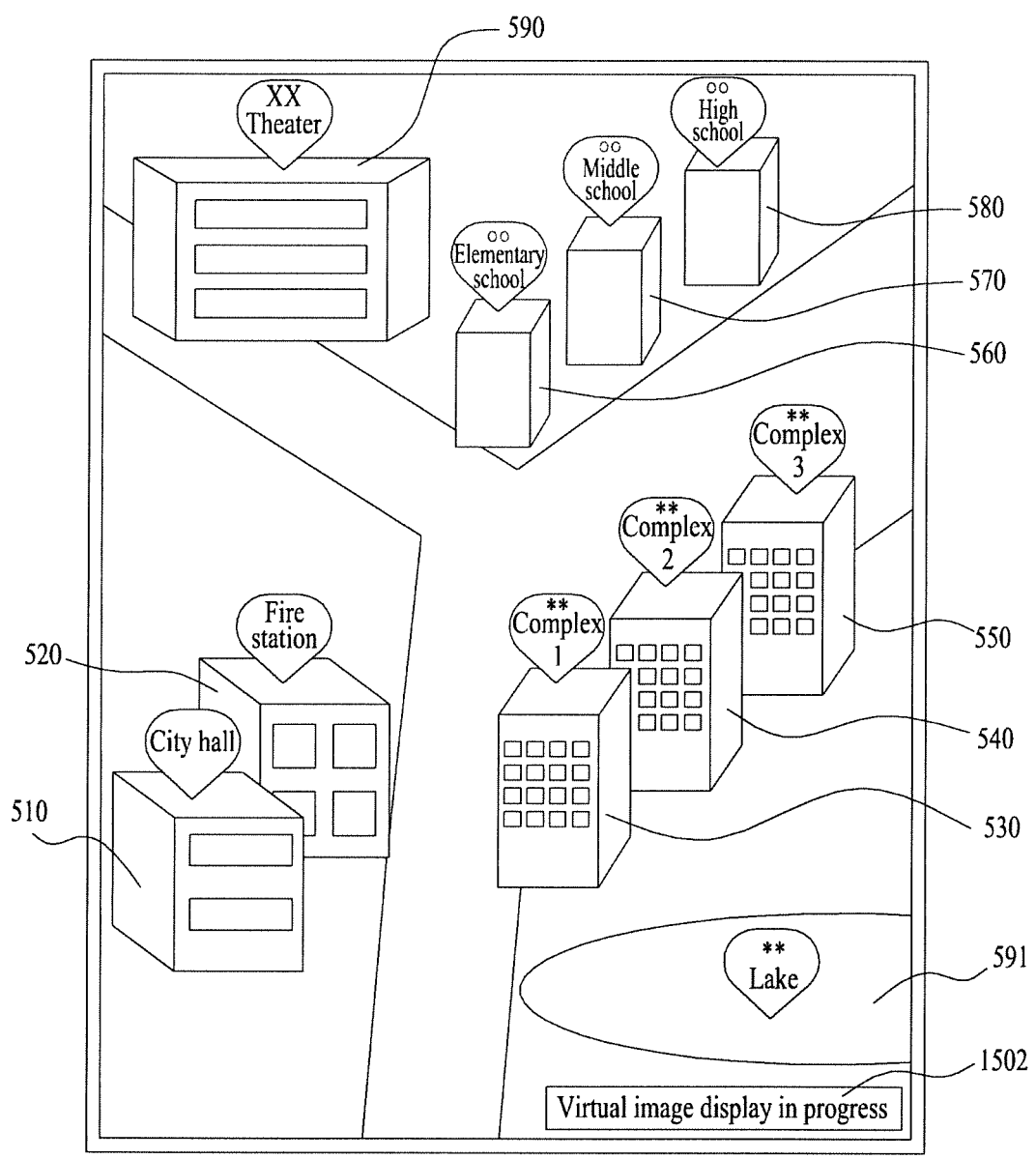

This is described in detail with reference to FIG. 15A and FIG. 15B as follows. FIG. 15A and FIG. 15B are diagrams of screen configurations for displaying an image provided by a server instead of a preview image according to the present invention.

Referring to FIG. 15A, since peripheral illumination intensity is equal to or smaller than a predetermined reference (e.g., evening hour after sunset, night hour, etc.), if a preview image inputted from the camera 121 is not clear, the mobile terminal 100 is able to receive a selection of a region (hereinafter named a virtual image region 1501) for requesting a virtual preview image from a user.

Referring to FIG. 15B, if the virtual image region 1501 is selected in FIG. 15A, the mobile terminal 100 displays a corresponding virtual preview image instead of a preview image actually inputted from the camera 121 and is then able to display each object relevant information by linking it to a corresponding object image within the corresponding virtual preview image.

Moreover, in FIG. 15B, it is able to display an indicator 1502 indicating that the virtual preview image is being displayed.

According to the present invention, the mobile terminal 100 displays categories of object relevant informations displayed within a current preview image and is then able to display the object relevant information corresponding to a specific category selected by a user from the displayed categories only.

Moreover, this is applicable to the sorting and display of object relevant information as well. The mobile terminal 100 is able to sort and display the object relevant information corresponding to a specific category selected by a user from the displayed categories only.

Figure 16A:
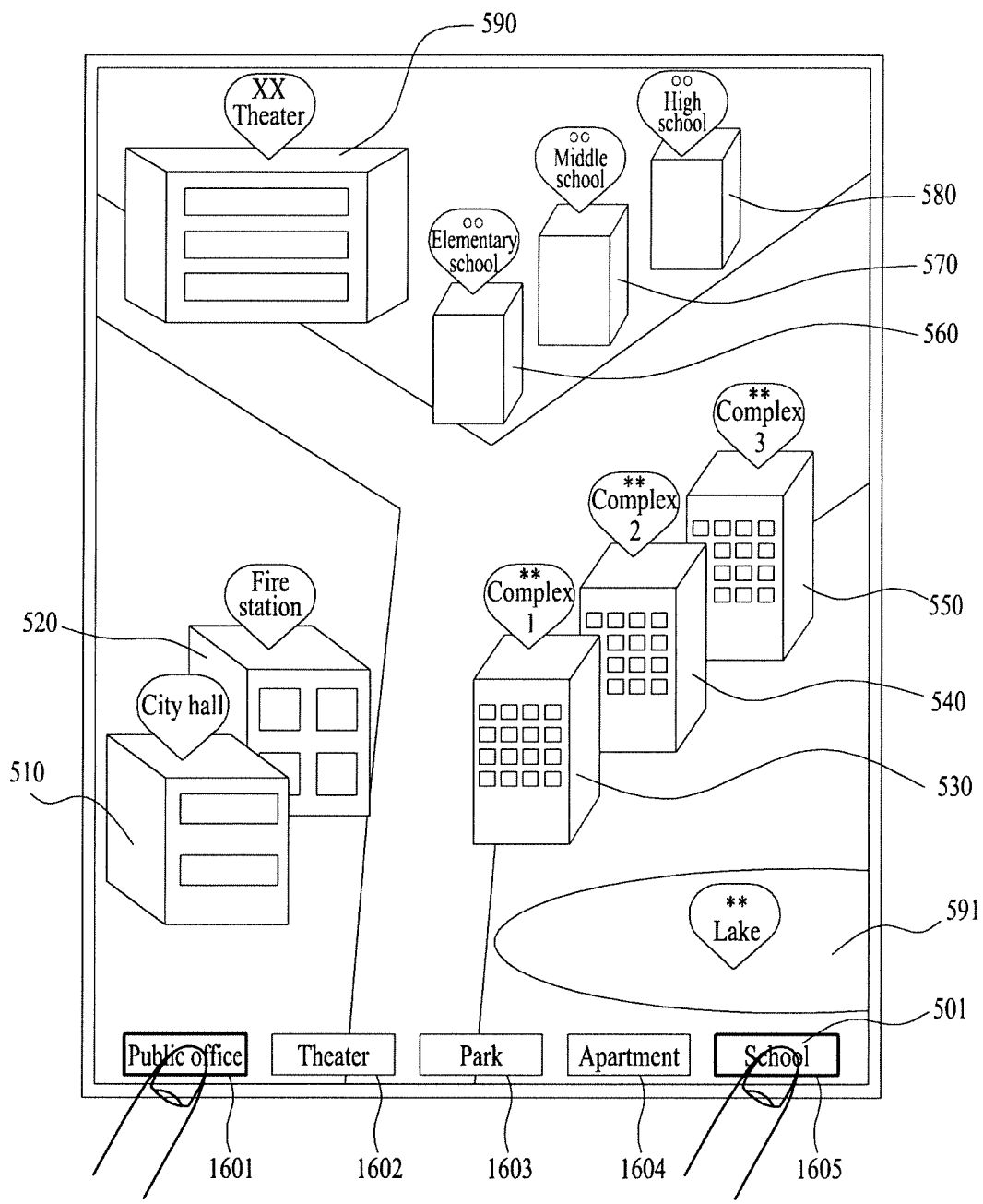
FIG. 16A and FIG. 16B are diagrams of screen configurations for displaying object relevant information belonging to a category selected by a user only according to the present invention.
Figure 16B:
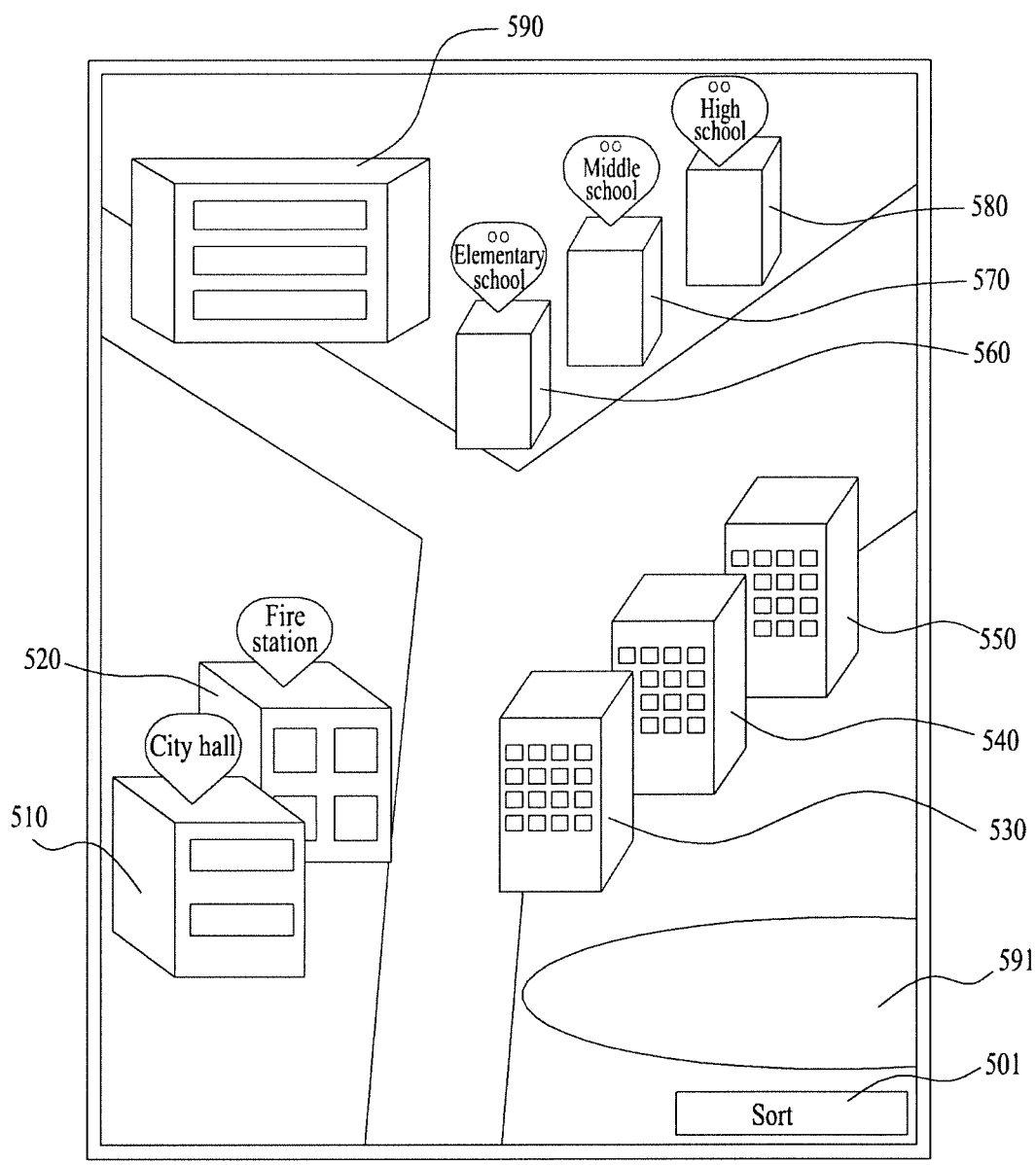

This is described in detail with reference to FIG. 16A and FIG. 16B as follows. FIG. 16A and FIG. 16B are diagrams of screen configurations for displaying object relevant information belonging to a category selected by a user only according to the present invention.

Referring to FIG. 16a, the mobile terminal 100 is able to display categories of object relevant informations displayed within a currently displayed preview image using category indicators 1601 to 1605.

Referring to FIG. 16B, if the category indicator 'public office' 1601 and the indicator 'school' 1605 are selected by a user in FIG. 16A, the mobile terminal 100 displays the object relevant information having the category set to 'school' or 'public office' within the preview image only and may not display the rest of the object relevant informations.

According to the present invention, the mobile terminal 100 is able to display a preview image including object relevant information in a manner of increasing or decreasing a size of the preview image under the control of the controller 180.

Figure 17A:
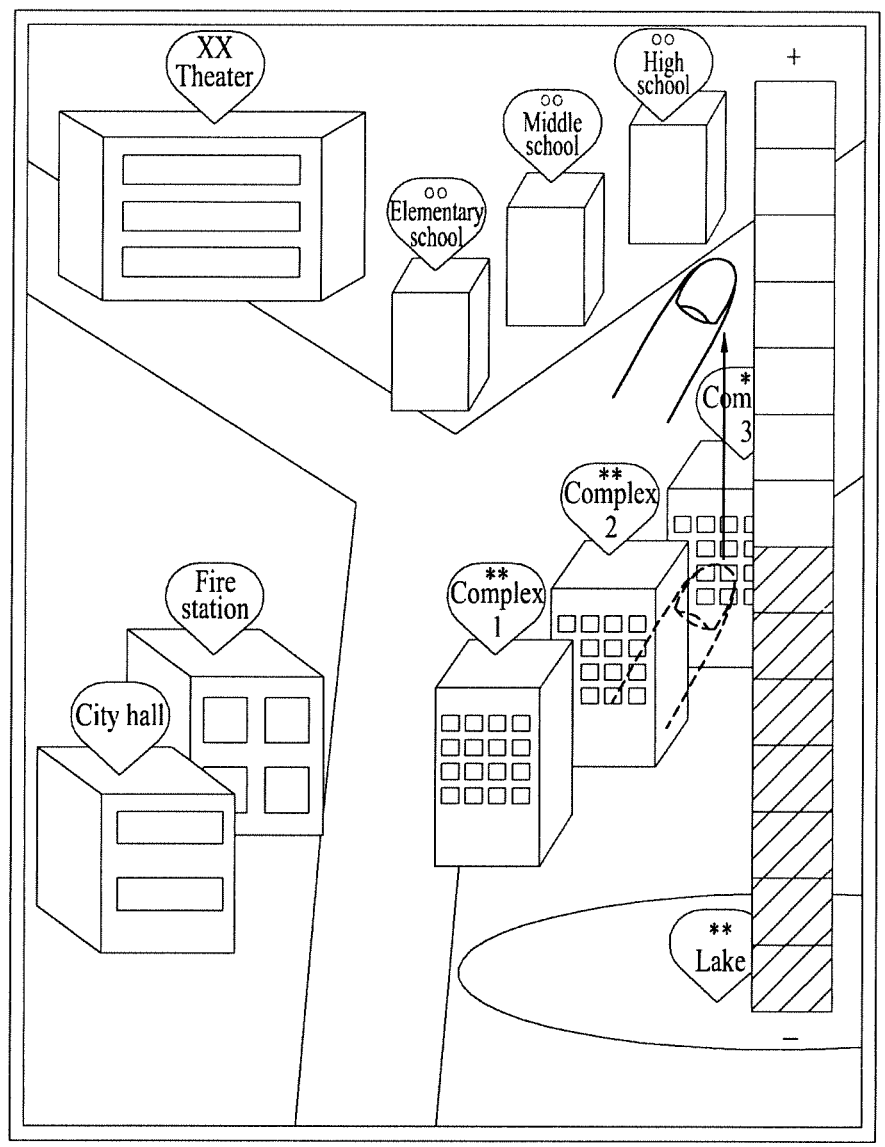
FIG. 17A and FIG. 17B are diagrams of screen configurations for displaying object relevant information in increasing a scale of a preview image according to the present invention.
Figure 17B:
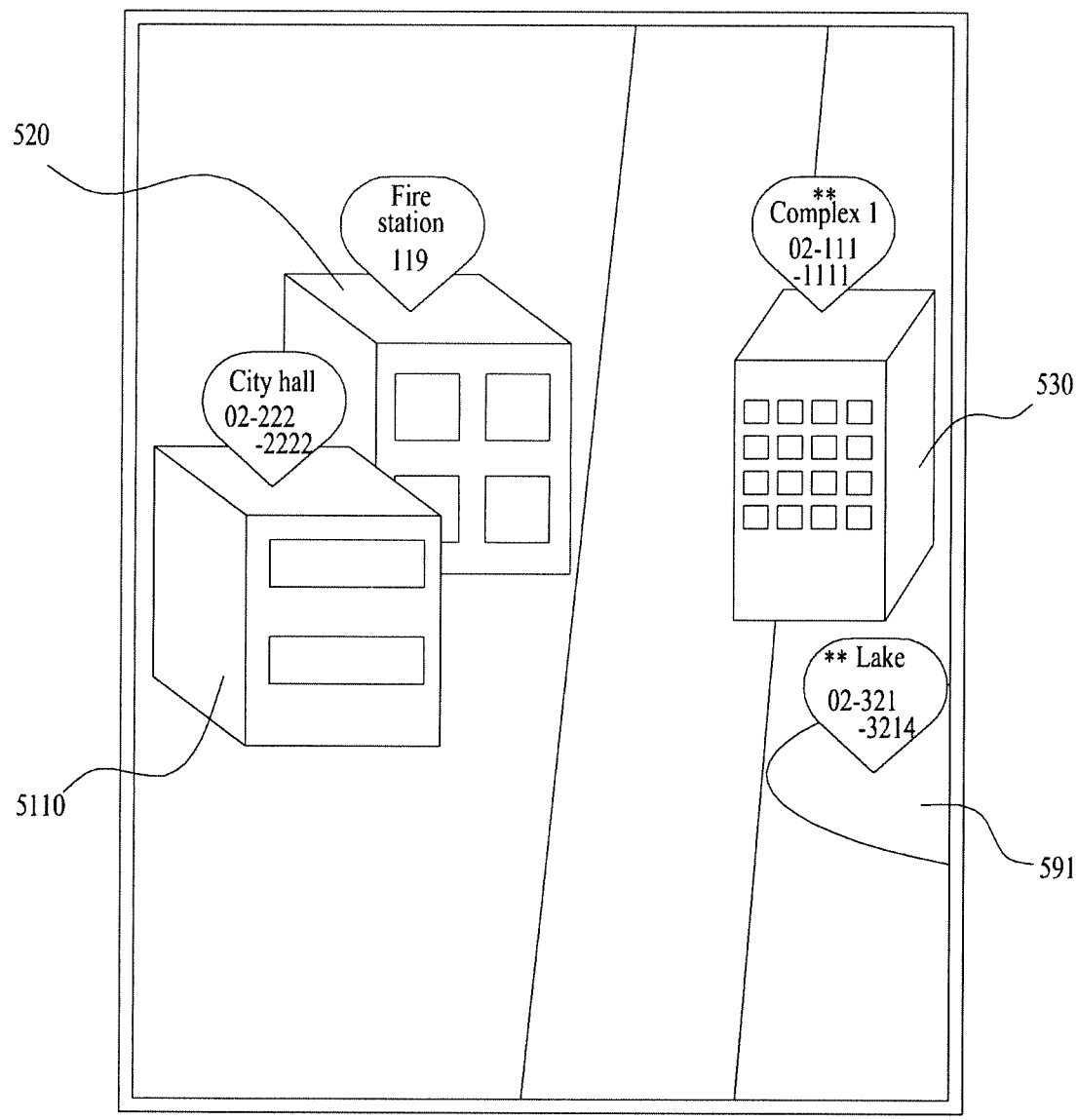

This is described in detail with reference to FIG. 17A and FIG. 17B. FIG. 17A and FIG. 17B are diagrams of screen configurations for displaying object relevant information in increasing a scale of a preview image according to the present invention.

Referring to FIG. 17A, the mobile terminal 100 can be provided with a scale adjust bar 1710 for receiving an input of a zoom-in/zoom-out extent of a preview image in a prescribed region of a screen. Therefore, a user is able to display the preview image in a manner of zooming in/out the preview image by manipulating the scale adjust bar 710. In doing so, the object relevant information can be zoomed in or out together with the preview image.

FIG. 17B shows a case that the preview image is displayed by zoom-in according to the result from manipulating the scale adjust bar 710 in FIG. 17A.

According to the present invention, the mobile terminal 100 enables object relevant information displayed within a preview image or additional information related to the object relevant information to be stored in the memory 160 under the control of the controller 180.

This is described in detail with reference to FIGS. 18A to 18C as follows.

Figure 18A:
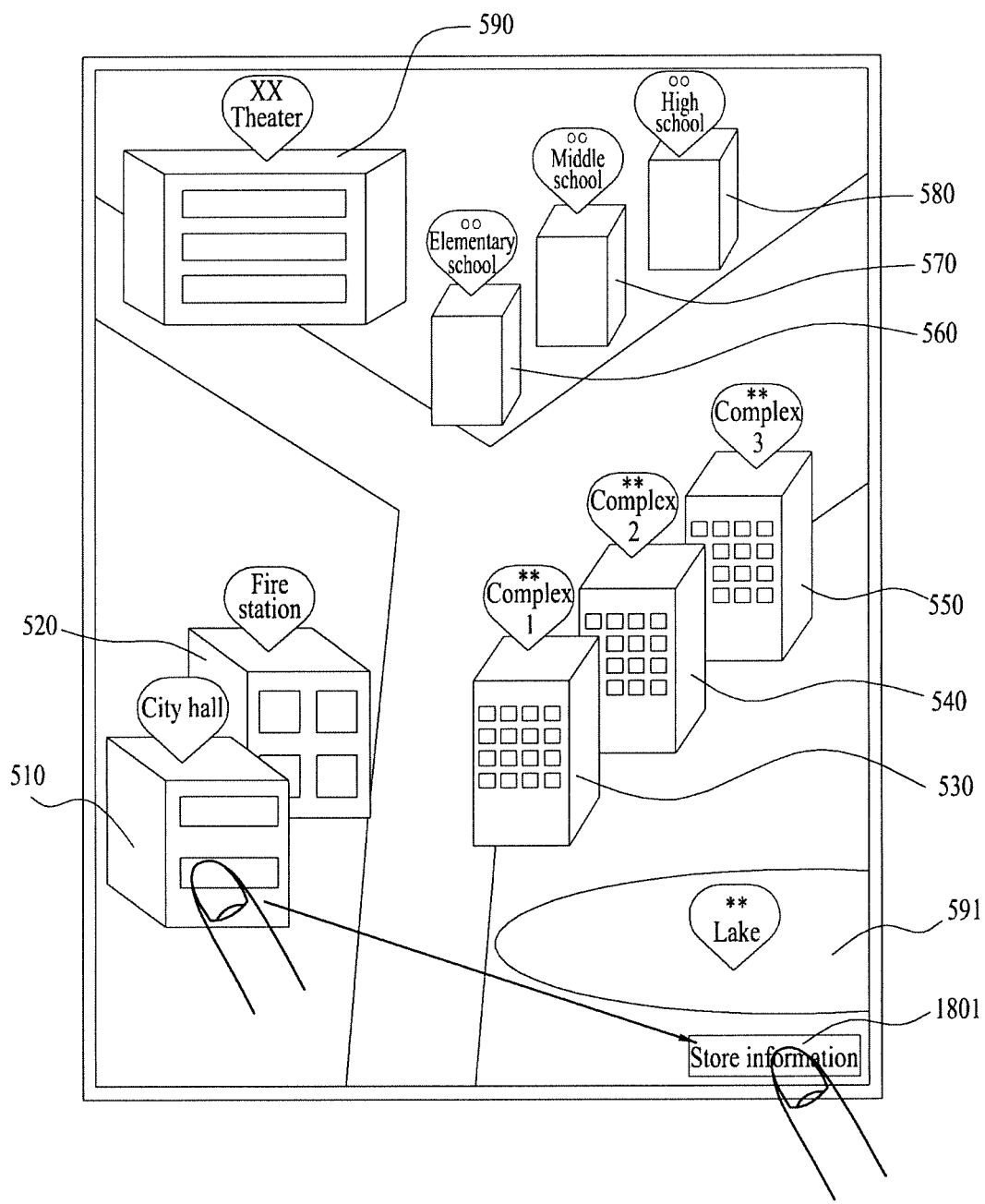
FIGS. 18A to 18C are diagrams of screen configurations for a process for storing additional information related to specific object relevant information displayed within a preview image in a terminal according to the present invention.
Figure 18B:
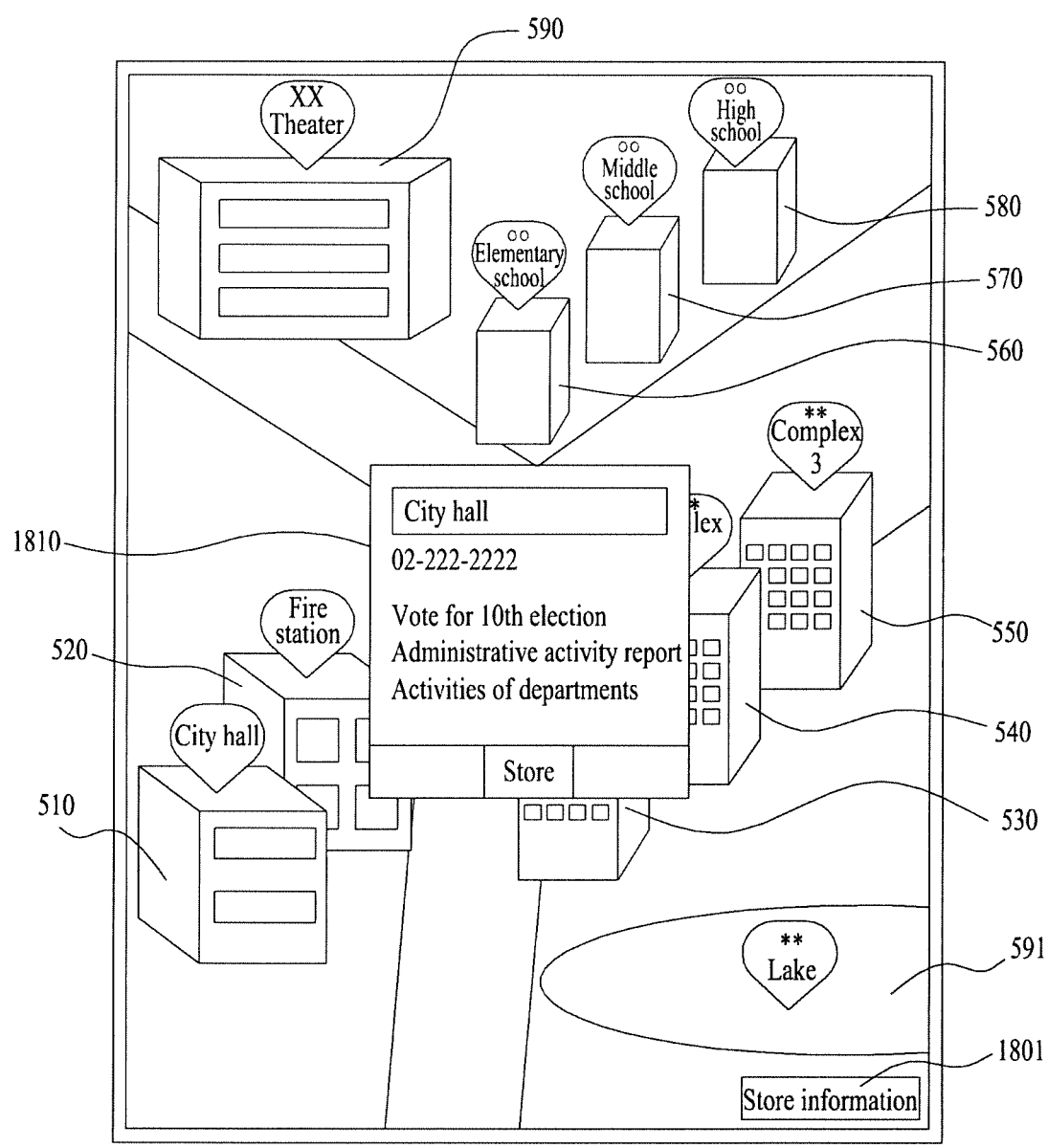
Figure 18C:
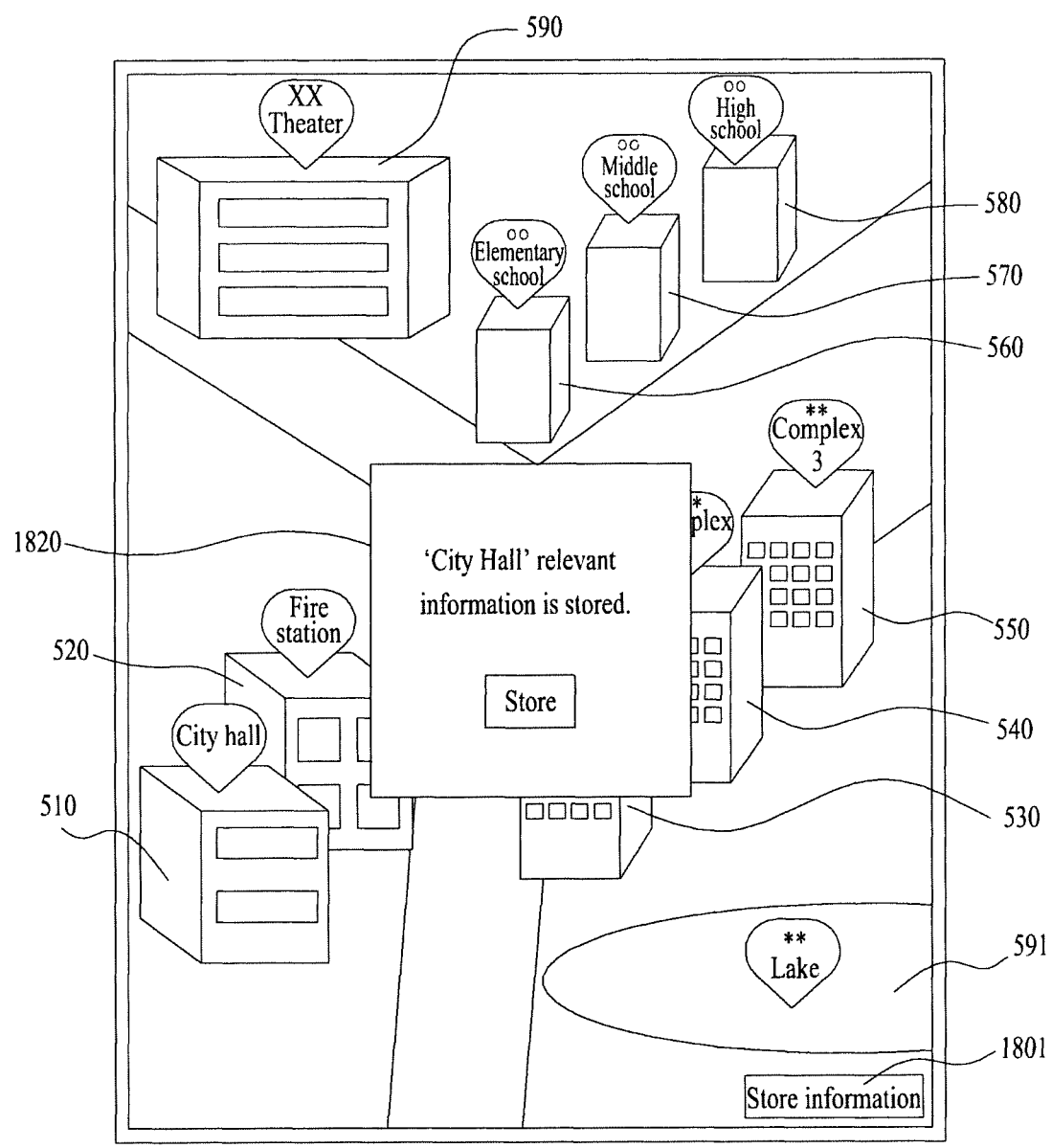

FIGS. 18A to 18C are diagrams of screen configurations for a process for storing additional information related to specific object relevant information displayed within a preview image in a terminal according to the present invention.

Referring to FIG. 18A, the mobile terminal 100 is able to receive an input of a touch & drag action from object relevant information 'city hall' displayed within a preview image to an information store zone 1801. Of course, after the object relevant information 'city hall' has been touched, a touch action can be performed on the information store zone 1801.

Therefore, in case of receiving the input of the touch & drag action from the object relevant information 'city hall' to the information store zone 1801, the mobile terminal 100 is able to perform a storage relevant operation for storing additional information related to the object relevant information 'city hall'.

Referring to FIG. 18B, as the mobile terminal 100 performs the storage relevant operation for storing additional information related to the object relevant information 'city hall', storable information 180 (e.g., city hall phone number, city hall notification informations, etc.) is displayed as a popup display and can be entire or partially stored according to a user selection.

Referring to FIG. 18C, the mobile terminal 100 is able to display a window 1820 indicating that the additional information related to the object relevant information 'city hall' is stored.

According to the present invention, the mobile terminal 100 is able to delete specific object relevant information among at least one or more object relevant informations displayed within a preview image under the control of the controller 180.

The deleted specific object relevant information may not be displayed within a currently displayed preview image only or may continue not to be displayed within a preview image displayed in the future.

Figure 19A:
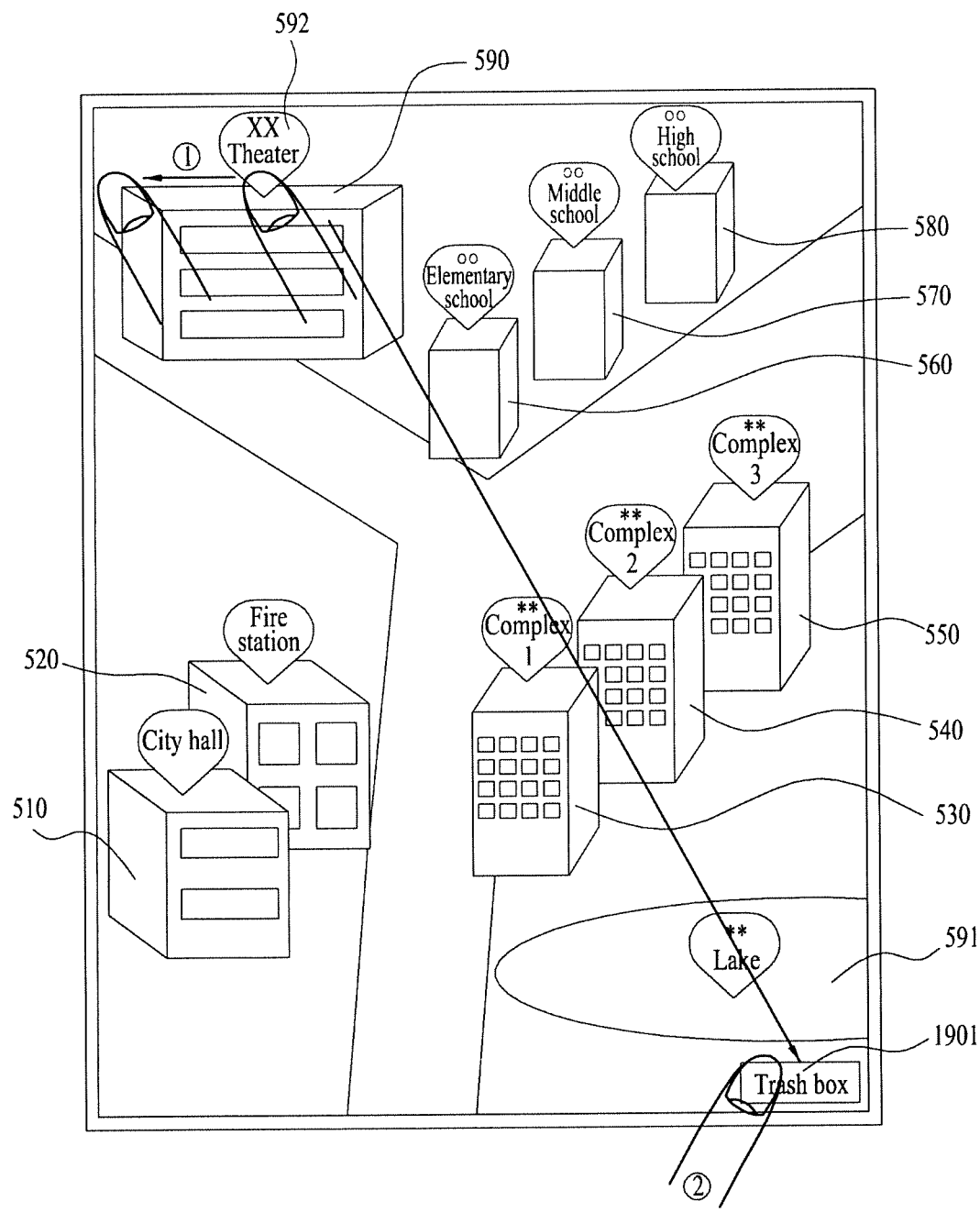
FIG. 19A and FIG. 19B are diagrams of screen configurations for deleting specific object relevant information displayed within a preview image according to the present invention.
Figure 19B:
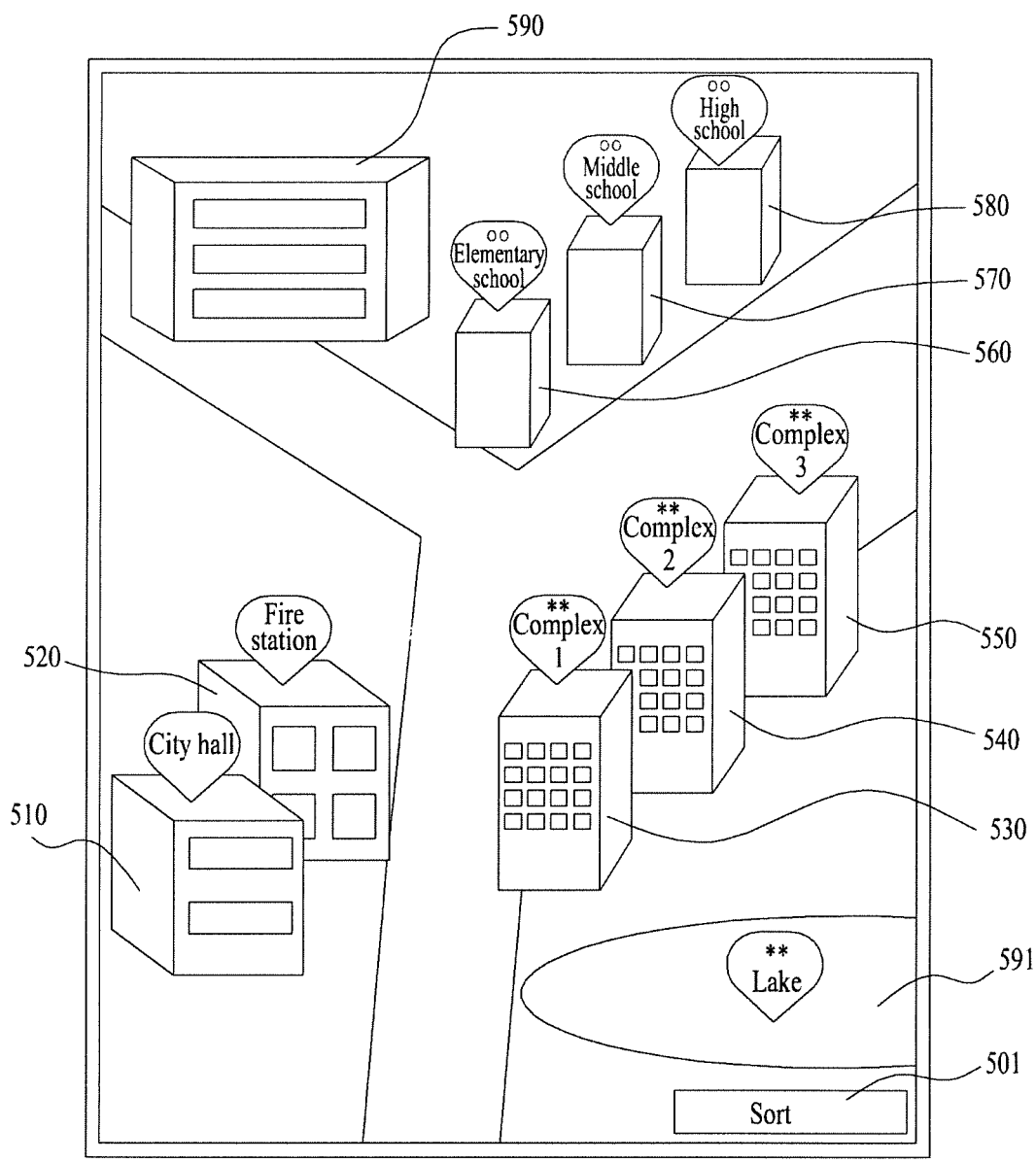

This is described in detail with reference to FIG. 19A and FIG. 19B as follows. FIG. 19A and FIG. 19B are diagrams of screen configurations for deleting specific object relevant information displayed within a preview image according to the present invention.

Referring to FIG. 19A, the mobile terminal 100 can receive an input of a delete command signal for deleting specific object relevant information 'xx theater' 592 from a user.

For instance, in case of receiving an input of a touch & drag action from the specific object relevant information 'xx theater' 592 to an image display boundary [①], an input of a touch & drag action from the specific object relevant information 'xx theater' 592 to a trash box zone 1901 [②], or an input of a touch action performed on each of the specific object relevant information 'xx theater' 592 and the trash box zone 1901 [not shown in the drawing], the delete command signal for deleting the specific object relevant information can be inputted.

Therefore, referring to FIG. 19B, the mobile terminal 100 does not further display the specific object relevant information 'xx theater' 592 within the preview image.

According to the present invention, the mobile terminal 100 is able to perform various control operations to effectively display object relevant information included in a preview image under the control of the controller 180.

Figure 20A:
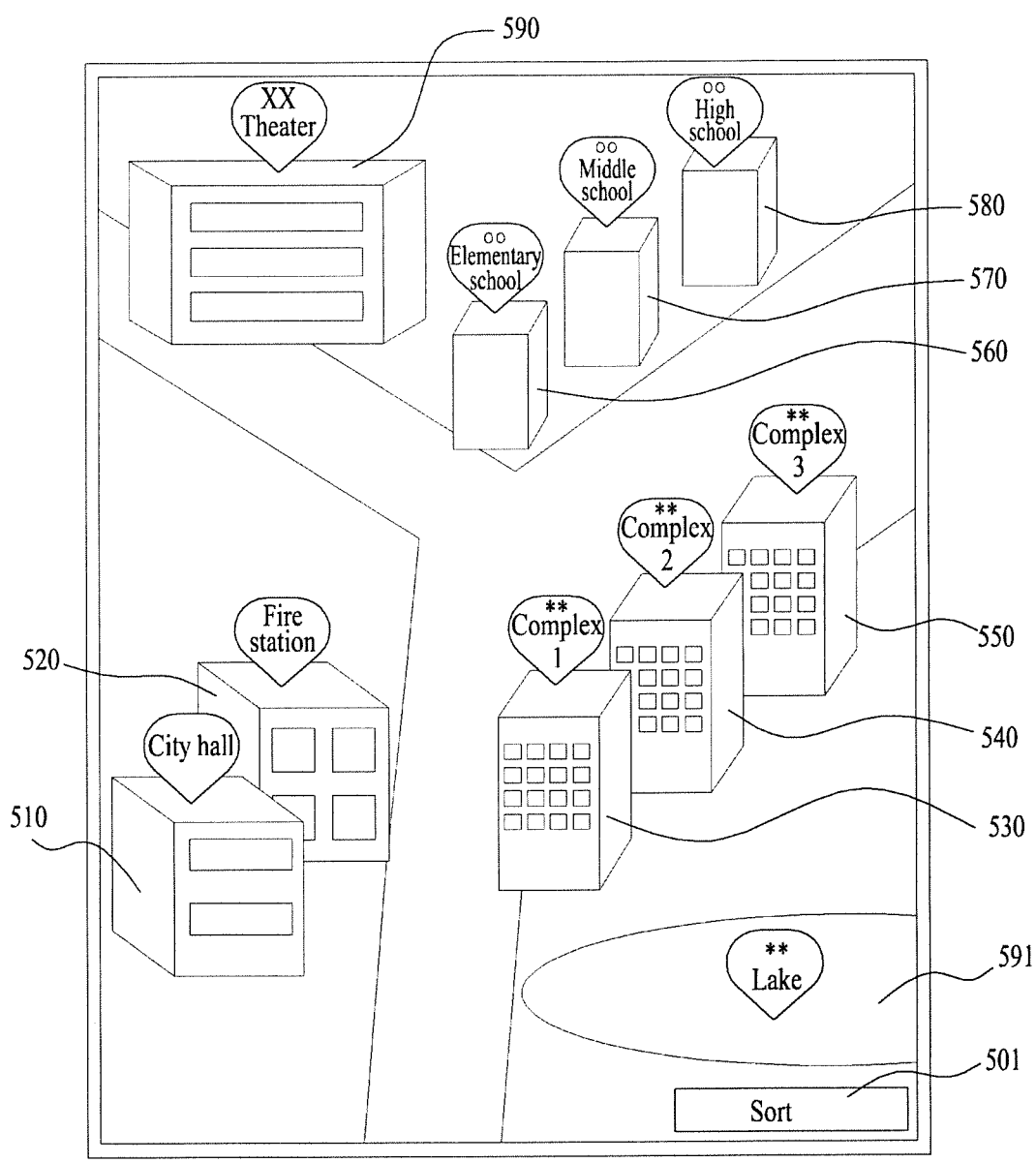
FIG. 20A and FIG. 20B are diagrams of screen configurations for displaying object relevant information within a preview image according to the present invention.
Figure 20B:
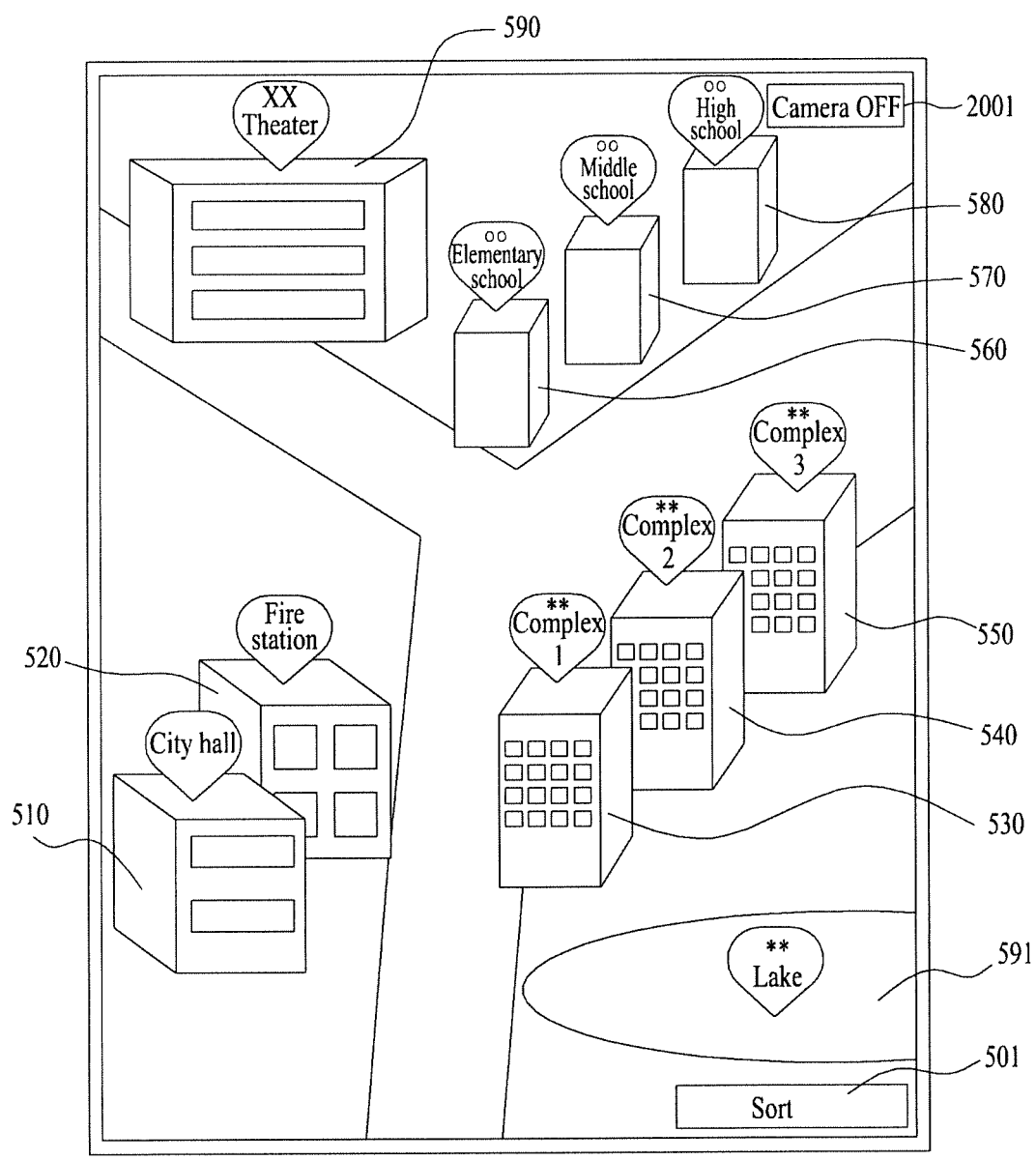

This is described in detail with reference to FIG. 20A and FIG. 20B as follows. FIG. 20A and FIG. 20B are diagrams of screen configurations for displaying object relevant information within a preview image according to the present invention.

Referring to FIG. 20A, in order to enable object relevant information to be clearly viewed, the mobile terminal 100 displays a relatively blurry preview image or is able to display object relevant information relatively thick.

Referring to FIG. 20B, in case of receiving an input of a fixing command signal (mentioned in the foregoing description) for fixing object relevant information, the mobile terminal 100 deactivates the camera 121 not to perform an image input operation using the camera 121. Moreover, even if a motion of the camera 121 or the mobile terminal 100 is detected, the mobile terminal 100 is able to fixedly display the object relevant information. In this case, the object relevant information can be fixedly displayed within a preview image displayed at an input timing point of the fixing command signal.

Besides, in case of detecting a predetermined count of shakings, the mobile terminal 100 displays object relevant information displayed in a preview image in a manner that the object relevant information is scattered toward screen edge. After predetermined duration, the object relevant information can be displayed in a manner of returning to its original position. Meanwhile, even if the object relevant information is displayed by being scattered, a connecting line between the object relevant information and the corresponding object image can be displayed.

Accordingly, the present invention provides the following effects and/or advantages.

First of all, the present invention is able to sort and display a plurality of object relevant informations included in an image, thereby preventing a display of the image itself from being interrupted by a display of the object relevant information.

Secondly, the present invention is able to sort and display a plurality of object relevant informations included in an image according to a prescribed reference, thereby providing a user with the sorted object relevant informations suitable for the prescribed reference.

According to one embodiment of the present invention, the above-described touch recognizing methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a camera module receiving an external input of a single image;
   a position location module obtaining position information related to the mobile terminal;
   a display unit displaying the single image;
   an input unit receiving user input; and
   a controller:
   obtaining the object relevant information of each of a plurality of objects within the single image that are located within a predetermined distance of the mobile terminal as determined by the position location module upon receiving user input of a sort command signal for sorting the object relevant information;
   controlling the display unit to sort and display the object relevant information of each of the plurality of objects according to a distance, a direction and a category of each of the plurality of objects and to display additional information corresponding to the sorted and displayed object relevant information according to a determined incline angle of the mobile terminal, the sorted object relevant information displayed as a concentric circle to correspond to the distance and direction of each of the plurality of objects with respect to the mobile terminal such that object relevant information belonging to a same category is indicated by using at least a same color or a same shape;
   receiving user input to select specific displayed sorted object relevant information;
   interrupting the sorting and display of the object relevant information and distinguishably displaying the selected specific object relevant information within the input single image.

2. The mobile terminal of claim 1, further comprising:
   a memory storing the object relevant information of each of the plurality of objects; and
   a wireless communication unit receiving the object relevant information of each of the plurality of objects from an external server,
   wherein the controller obtains the object relevant information of each of the plurality of objects by searching the object relevant information for each of the plurality of objects stored in the memory or receiving the object relevant information of each of the plurality of the objects from the external server.

3. The mobile terminal of claim 1, wherein sorting and displaying the object relevant information comprises the display unit displaying the object relevant information of each of the plurality of objects on a grid type table to correspond to the distance and category of each of the plurality of objects.

4. The mobile terminal of claim 1, wherein sorting and displaying the object relevant information comprises the display unit distinguishably displaying the object relevant information that meets a prescribed condition.

5. The mobile terminal of claim 1, wherein:
   the controller sorts at least one object belonging to a category corresponding to a current time zone among the plurality of objects according to a category per time zone; and
   the display unit sorts and displays the object relevant information of the sorted at least one object.

6. A method of displaying an image in a mobile terminal, comprising:
   receiving an external input of a single image;
   determining a position of the mobile terminal;
   obtaining object relevant information of each of a plurality of objects within the input single image that are located within a predetermined distance of the mobile terminal upon receiving user input of a sort command signal for sorting the object relevant information;
   displaying the input single image;
   sorting and displaying the object relevant information of each of the plurality of objects according to a distance, a direction and a category of each of the plurality of objects and displaying additional information corresponding to the sorted and displayed object relevant information according to a determined incline angle of the mobile terminal, the sorted object relevant information displayed as a concentric circle to correspond to the distance and direction of each of the plurality of objects with respect to the mobile terminal such that object relevant information belonging to a same category is indicated by using at least a same color or a same shape;

receiving user input to select specific displayed sorted object relevant information;

interrupting the sorting and display of the object relevant information and distinguishably displaying the selected specific object relevant information within the input single image.

7. The method of claim 6, further comprising:

storing the object relevant information of each of the plurality of objects; and receiving the object relevant information of each of the plurality of objects from an external server, wherein obtaining the object relevant information comprises obtaining the object relevant information of each of the plurality of objects by searching the stored object relevant information for each of the plurality of objects or receiving the object relevant information of each of a plurality of the objects from the external server.

8. The method of claim 6, wherein the sorted object relevant information of each of the plurality of objects is displayed on a grid type table to correspond to the distance and category of each of a plurality of the objects.

9. The method of claim 6, further comprising:

sorting one object among the plurality of objects that belongs to a category corresponding to a current time zone in order to correspond to a category according to time zone, wherein sorting and displaying the object relevant information comprises sorting and displaying the object relevant information of the sorted one object.

* * * * *